US007145851B2

(12) United States Patent
Fukushima et al.

(10) Patent No.: US 7,145,851 B2
(45) Date of Patent: Dec. 5, 2006

(54) OPTICAL DISK APPARATUS AND INFORMATION RECORDING APPARATUS

(75) Inventors: Akio Fukushima, Yokohama (JP); Masayoshi Okawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 10/448,928

(22) Filed: May 30, 2003

(65) Prior Publication Data
US 2004/0042360 A1 Mar. 4, 2004

(30) Foreign Application Priority Data
May 30, 2002 (JP) ............................. 2002-156644
Sep. 27, 2002 (JP) ............................. 2002-282169

(51) Int. Cl.
*G11B 7/005* (2006.01)
(52) U.S. Cl. ............... 369/47.31; 369/47.5; 369/53.35
(58) Field of Classification Search ..................... None
See application file for complete search history.

(56) References Cited

U.S. PATENT DOCUMENTS 6,920,095 B1 * 7/2005 Morishima ............... 369/47.38

6,937,542 B1 * 8/2005 Ogawa ..................... 369/44.13

FOREIGN PATENT DOCUMENTS

JP 11-306686 11/1999

* cited by examiner

*Primary Examiner*—Thang V. Tran
*Assistant Examiner*—Joseph Haley
(74) *Attorney, Agent, or Firm*—Townsend and Townsend and Crew LLP

(57) ABSTRACT

In the CAV recording, it is necessary to vary the recording-system clock frequency in accordance with movement of a recording position, and conventionally a signal generated by multiplying a wobble signal is used as the recording-system clock. However, since the wobble signal is easily susceptible to influences of a disk and a pick-up and its quality is prone to be deteriorated by an influence of a large amount of light at the time of recording etc., it is difficult to maintain jitters of the recording-system clock to a sufficiently low value. To resolve this problem, instead of generating a recording-system clock signal from the wobble signal that is susceptible to noise, a necessary recording-system clock frequency is calculated from the address information that has been modulated into the wobble signal and recorded therein, and a signal of this frequency is generated from a stable reference signal source, such as a quartz oscillator, by a synthesizer method and used as the recording-system clock.

24 Claims, 15 Drawing Sheets

OPTICAL DISK APPARATUS AND INFORMATION RECORDING APPARATUS

BACKGROUND OF THE INVENTION

1. Field of the Invention

This invention relates to an information recording apparatus for recording information onto an information recording medium and, more particularly, to an optical-disk recording apparatus for recording the information onto an optical disk, such as CD-R, CD-RW, DVD-R, DVD-RW, while it is being rotated.

2. Description of the Related Art

Conventionally, almost all the optical-disk recording apparatus for recording the information onto a recordable optical disk, such as CD-R, CD-RW, DVD-R, DVD-RW, each controls a rotational speed of a spindle motor for rotating the optical disk in such a way that a liner velocity at which an optical spot for recording the information optically scans a track having a shape of a groove that is formed beforehand on the optical disk becomes virtually constant (Constant Linear Velocity, hereinafter referred to as "CLV") when recording the information. However, recently there have appeared some optical-disk recording apparatuses each of which records the information in such a way that an angular velocity of an optical disk being recorded is controlled to be virtually constant (Constant Angular Velocity, hereinafter referred to as "CAV"). Merits associated with a change of the disk rotational speed at the time of recording from a CLV scheme to a CAV scheme are enumerated as follows: since it is not necessary to vary the disk rotational speed even when the recording position on the disk is changed, settling time of the rotational speed is unnecessary; there is no increase in power consumption caused by acceleration and deceleration when the rotational speed is varied; etc.

When recording the information at CAV, the linear velocity varies according to the radius of the recording position on the disk, and consequently the data transfer rate during the recording is changed. Therefore, several circuits, such as an encoder circuit for generating recording data and a recording strategy circuit for determining laser irradiation timing necessary in the recording, are required to be capable of varying an operating speed during the recording; therefore, the clock signal serving as a reference of the operation of each circuit (hereinafter referred to as the "recording-system clock") must be capable of being varied.

Next, a method for performing CAV recording will be explained. In order to record the information at CAV actually, it is necessary to rotate the disk at CAV. To achieve this, all that is necessary is just to add a sensor for detecting the rotational speed, such as an FG, on the spindle motor to obtain a signal of a frequency proportional to the rotational speed and control the rotational speed of the spindle motor so that the frequency of this rotational speed signal becomes approximately constant. Concretely, a frequency and/or a phase of the rotational speed signal are compared to those of a fixed standard frequency signal, and the rotational speed of the spindle motor is so controlled that this difference becomes as small as possible. At this time, the frequency of the rotational speed becomes approximately constant and the disk rotates at CAV.

When the disk is being rotated at CAV, the data recording density varies according to the recording radius, and as a result, a recording-system clock frequency varies. Here, as described above, the CD standard stipulates that a ratio between the carrier frequency and the recording-system clock frequency shall be a constant value regardless of the disk rotational speed. This relation also stands even when the spindle motor is rotating at CAV.

Note here that even when the disk is being rotated at CAV, it is possible to detect the carrier frequency and determines the recording-system clock frequency from this value. Concretely, all that is necessary is just to generate a signal having the above-mentioned specified frequency ratio with reference to the carrier frequency using a PLL circuit etc. and set it as the recording-system clock. In the conventional technology, the CAV recording is realized by controlling the spindle motor and the recording-system clock in this way.

In the case of realizing the CAV recording by the above-mentioned method, the processing is such that a carrier signal is extracted from a wobble signal that is reproduced from the disk via a pick-up, and based on this signal the recording-system clock is generated by a clock generating system such as the PLL circuit. Therefore, the recording-system clock is affected by the disk, the CAV control system for rotating the disk, a wobble-signal reproduction system, a carrier-signal extraction system, a clock generation system, etc. Therefore, in order to improve reproduction quality of the wobble signal, it is necessary to implement a measure, for example, such a contrivance as is disclosed in the patent document 1.

SUMMARY OF THE INVENTION

In the above-mentioned conventional technology, influences that several constituents, such as the disk and the CAV control system for rotating the disk, exert on the quality of a recording-system clock will be explained concretely. Here, "quality of the recording-system clock" means stability of the clock. More specifically, long-term stability means that a specified recording data rate is maintained from the beginning of the disk recording until the end of the recording, and short-term stability means that jitters of the clock are suppressed low.

First of all, regarding the disk, it may be said that difference in the quality among manufacturers thereof (for example, accuracy of a meandering period of the wobble) is large, and for CD-R disks a product whose quality does not conform to the standard may appear in the market by accident.

Since the CAV control system, as described above, is controlled by the UG signal and the standard frequency signal and is composed of a circuit system inside the recording apparatus, it can be said that it is relatively stable and has high reliability.

The wobble-signal reproduction system is composed of an optical pick-up and a signal processing circuit of a front end. Among these constituents, the optical pick-up varies widely in performance and may suffer a problem of matching with the disk; therefore, it is not safe to say that the optical pick-up necessarily possesses high stability and high reliability. Moreover, the reproduction system of the wobble signal is conducted by sample/hold processing in which the wobble signal is sampled and detected for a period of time at a time when the amount of emitted light from the pick-up becomes comparative to that at the time of reproducing; a signal to noise ratio tends to be deteriorated partly because of sample/hold processing itself and partly because of a leakage of an excess signal at the time of recording due to mismatching of sample/hold timing.

The carrier-signal extraction system is so structured that only the carrier signal is extracted from signals included in the wobble signal with a band-pass filter. Here, it should be noted that in the CAV recording, as the radial distance of the recording position increases, the linear velocity increases and accordingly the carrier frequency increases. The carrier signal extraction system must be a frequency automatic tracking band-pass filter that detects a frequency of the carrier signal outputted by itself and varies a center frequency of its own band-pass filter that tracks frequency variation of the carrier signal to be extracted based on the detected frequency to extract the carrier signal. Therefore, once this frequency automatic tracking band-pass filter system loses the carrier frequency by a certain cause, normally a center frequency of the band-pass filter cannot be recovered to a correct value and thereafter a phenomenon that the wobble signal cannot be reproduced will occur. Therefore, means to avoid this phenomenon by a certain method is essential.

The clock generation system is a circuit for generating the recording-system clock of a frequency that has a specific ratio to the frequency of the inputted wobble signal and is normally constructed by applying a circuit known as the PLL circuit. Because of a structure of the PLL circuit, it is often the case where, when the inputted wobble signal is of bad quality and has much noise in the carrier signal, variation frequency of the carrier signal may increase and behave as if the frequency of the wobble signal were increased. Moreover, in this case, although the actual carrier signal does not change at all, a phase-error detection system of the PLL outputs an erroneous signal, this erroneous signal becomes a noise to the frequency-error detection system and hence becomes an factor that increases the jitters of the recording-system clock that is an output signal of the PLL. Even in the case where the wobble signal is of good quality, since the wobble signal itself is frequency modulated and so the carrier signal frequency varies temporally, it is required to allow a width of this frequency variation, and since the carrier frequency varies by a factor of approximately 2.5 between the inner peripheral portion and the outer peripheral portion, the PLL must be configured so as to have a capture range larger than this factor. From the above-mentioned restrictions and the like in the design, it is not easy to achieve coexistence of the performance of the PLL and the jitters of the recording system.

As described in the foregoing, it is not easy to maintain the recording-system clock in excellent quality in the prior-art method for generating the recording-system clock; therefore, the CAV recording was not easy to be realized although there are enumerated a lot of merits for the CAV recording as compared to the CLV recording.

The aforesaid problem will be improved by the following scheme: when a frequency of the said recording-system clock is generated from a stable frequency signal source (oscillator device), such as a quartz oscillator, by a method called a frequency synthesizer, the recording-system clock is adjusted so as to have a frequency near a target frequency of the recording-system clock that is calculated by several pieces of information including address information, track pitch of the disk, linear velocity, rotational angular velocity, targeted position of recording on the disk, etc. and is outputted.

Concretely, the problem may be improved by using an optical disk apparatus capable of recording the information optically onto a recordable optical disk whose recording track is formed in a wobble format and comprising: driving means for driving the above-mentioned recordable optical disk rotationally, detecting means for detecting the address information recorded on the above-mentioned recording track, an oscillator device for oscillating a signal of a specific frequency, and recording-system clock generating means for generating a recording-system clock used when recording the information onto the recordable optical disk based on the address information and the output signal of the oscillator device.

Other and further objects, features and advantages of the invention will appear more fully from the following description.

DETAILED DESCRIPTION OF THE PREFERRED EMBODIMENTS

Figure 1:
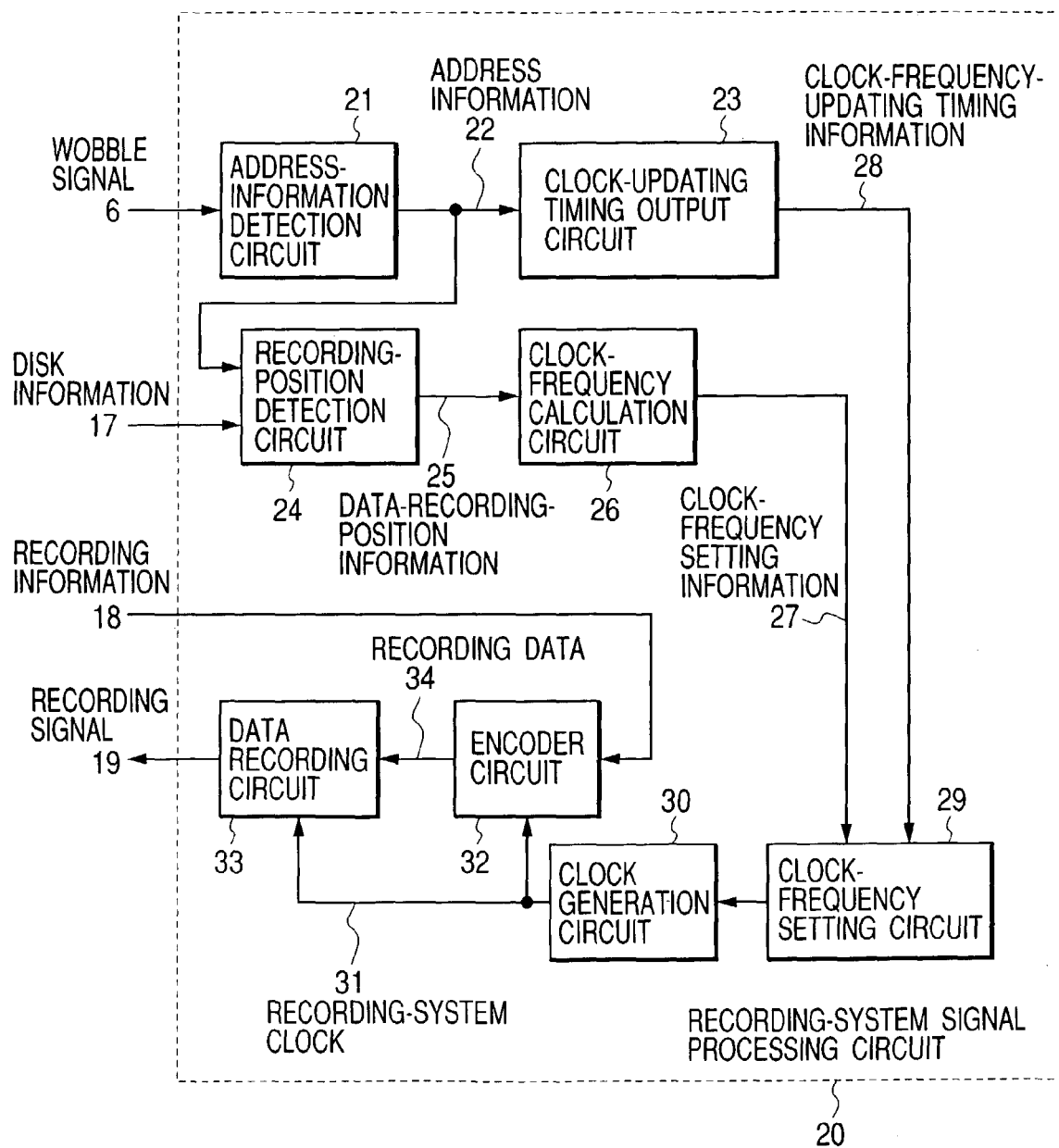
FIG. 1 is a block diagram of a recording-system signal processing circuit 20 in the first embodiment of this invention.

Hereafter, examples of embodiments of this invention will be described referring to the drawings. While in the following embodiments, description will be made by taking an example of an optical-disk recording apparatus for recording the information onto the CD-R disk, this invention is not limited to this, but can also be applied to optical-disk recording apparatuses for recording the information onto one or more disks selected from among CD-RW, DVD-R, DVD-RE, DVD+RE, DVD+R, etc., and further can be applied to ordinary optical-disk recording apparatuses and magnetic disk apparatuses.

Figure 2:
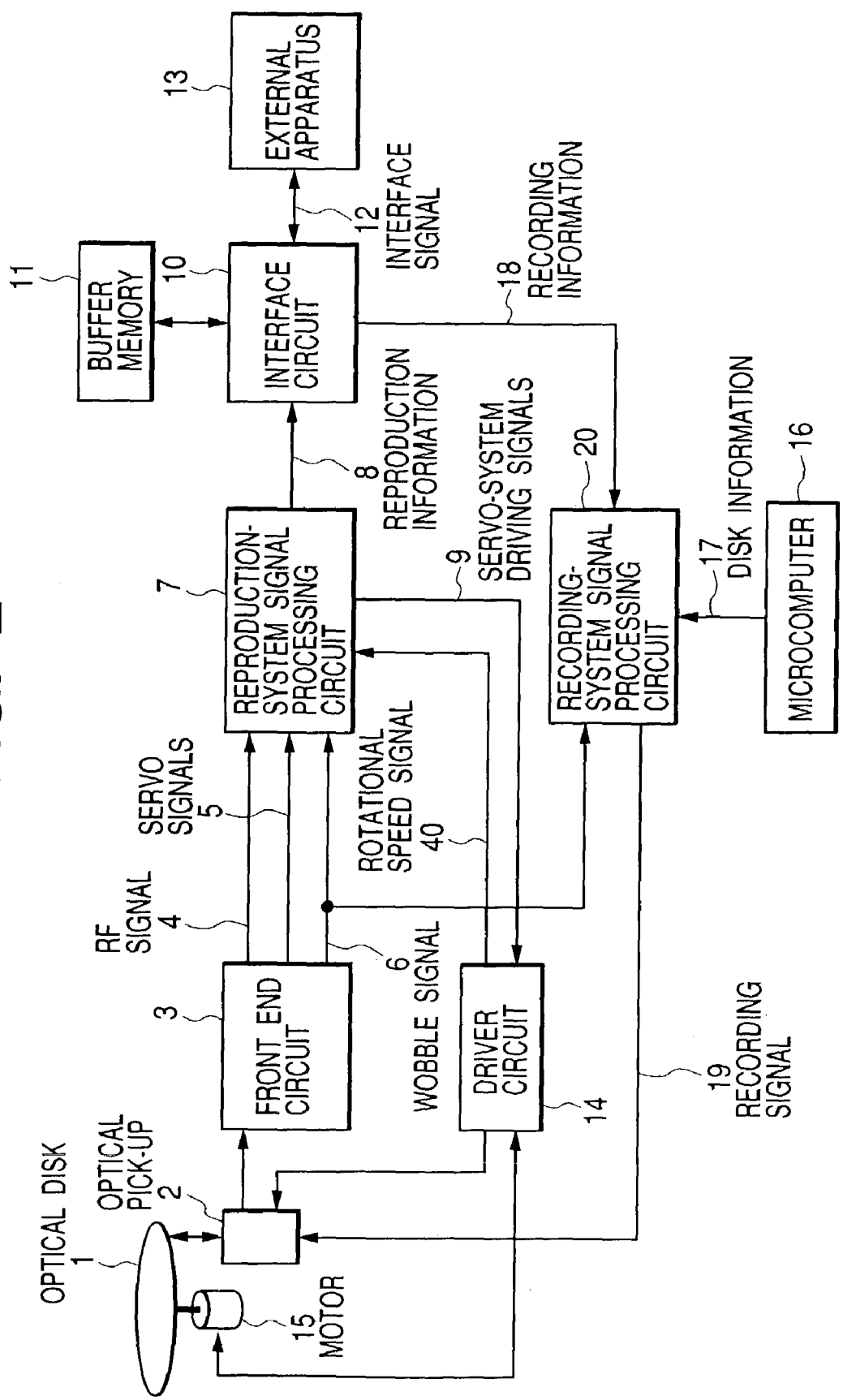
FIG. 2 is a block diagram of a main part of an optical disk recording apparatus including a recording-system block of this invention.

FIG. 1 and FIG. 2 show the first embodiment of this invention. FIG. 1 shows a block diagram of a part pertaining to the data recording according to this invention that is a part of an optical-disk recording apparatus capable of recording the CD-R disk. Moreover, FIG. 2 shows a block diagram of a main part of the optical disk recording apparatus including the recording-system block of this invention shown in FIG. 1.

First, a case of reproducing information from the disk will be explained referring to FIG. 2. A signal detected from an optical disk 1 using an optical pick-up 2 is inputted to a front end circuit 3. The front end circuit 3 conducts mainly analog processing on the input signal to generate an RF signal 4, servo signals 5, etc. These signals outputted from the front end circuit 3 are inputted to a reproduction-system signal processing circuit 7. The reproduction-system signal processing circuit 7 conducts mainly digital signal processing to generate reproduction information 8, servo-system driving signals 9, etc. The reproduction information 8 is inputted to an interface circuit 10. The interface circuit 10 conducts processing, such as buffering of the data, using a buffer memory 11 connected thereto and outputs information to an external apparatus 13 by way of interface signals 12. On the other hand, the servo-system driving signal 9 is inputted to driver circuits 14. The driver circuit 14 conducts power amplification etc. to drive actuators (not shown in the figure) inside the optical pick-up 2, a motor for moving the whole body of the optical pick-up (not shown in the figure), and a motor for rotating the optical disk 1. Note that in the reproduction of information in an actual optical disk apparatus, diverse circuit systems, such as various servo systems, an access system, an RF signal demodulation system, an error detection/correction system, and a voice reproduction system, are working in cooperation with one another. However, since these constituent members do not have a direct connection with this invention, description thereof is omitted.

Next, a case of recording the information onto the optical disk will be explained referring to FIG. 1 and FIG. 2. The signal detected from the optical disk 1 using the optical pick-up 2 is inputted to the front end circuit 3. The front end circuit 3 conducts mainly analog signal processing to generate servo signals 5, a wobble signal 6, etc. These signals outputted from the front end circuit 3 are inputted to the reproduction-system signal processing circuit 7. The reproduction-system signal processing circuit 7 conducts mainly digital signal processing to generate servo-system driving signals 9. Moreover, the wobble signal 6 is inputted to the recording-system signal processing circuit 20.

The wobble signal 6 is inputted to an address-information detection circuit 21 inside the recording-system signal processing circuit 20. The address-information detection circuit 21 demodulates the wobble signal 6 into the address information (ATIP, Absolute Time In Pre-groove) and outputs address information 22. The address information 22 is inputted to a clock-updating timing output circuit 23 and a recording-position detection circuit 24.

On the other hand, several pieces of the disk information 17, such as the track pitch, the linear velocity, and the recording start position radius, that are measured or calculated by a microcomputer 16 are inputted to the recording-position detection circuit 24 inside the recording-system signal processing circuit 20. The recording-position detection circuit 24 calculates and outputs data-recording-position information 25 from the disk information 17 and the address information 22. The data-recording-position information 25 is inputted to a clock-frequency calculation circuit 26.

The clock-frequency calculation circuit 26 calculates a frequency of the recording-system clock that corresponds to the inputted data-recording-position information 25 and sets its value as a target recording-system clock frequency. Then the clock-frequency calculation circuit 26 outputs, as clock-frequency setting information 27, information that is necessary to designate a clock frequency that is near this target recording-system clock frequency and satisfies predetermined conditions as the recording-system clock. The clock-updating timing output circuit 23 outputs a clock-frequency-updating timing information 28 at a time when an increment of the address information 22 with reference to the initial value exceeds a specified value being set beforehand. The clock-frequency setting information 27 and the clock-frequency-updating timing information 28 are inputted to the clock-frequency setting circuit 29. When the clock-frequency-updating timing information 28 is inputted to the clock-frequency setting circuit 29, the clock-frequency setting circuit 29 updates setting of the clock generation circuit 30 based on the clock-frequency setting information 27 at that time point. The clock generation circuit 30 generates a clock of a frequency that is based on the setting given by the clock-frequency setting circuit 29 and outputs it as a recording-system clock 31.

The recording-system clock 31 is inputted to an encoder circuit 32 and a data recording circuit 33. On the other hand, the information to be recorded onto the optical disk 1 is inputted to an interface circuit 10 from the external apparatus 13 by way of the interface signal 12. The interface circuit 10 conducts processing, such as buffering of the data, using the buffer memory 11 connected thereto and outputs recording information 18. The recording information 18 is inputted to the recording-system signal processing circuit 20. More specifically, the recording information 18 is inputted to the encoder circuit 32 inside the recording-system signal processing circuit 20. The encoder circuit 32 conducts the processing in accordance with predetermined encode rules on the recording information 18 to generate recording data 34. The recording data 34 is inputted to the data recording circuit 33. The data recording circuit 33 conducts such processing as to conduct recording power control and recording strategy control that are necessary for recording an actual optical disk on the recording data 34, and generates a recording signal 19.

The recording signal 19 is inputted to the laser driving circuit (not shown in the figure) inside the optical pick-up 2. A laser (not shown in the figure) emits light of such a quantity of outgoing light and with such emitting timing as corresponds to the recording signal 19 to record the information onto the optical disk 1. Note that in recording the information in the actual optical disk apparatus, various circuit systems, such as various servo systems, the access system, the error detection/correction system, and the recording power/timing control system, in addition to the systems described above, are working in cooperation with one another. However, since these circuit systems do not have a direct connection with this invention, description thereof is omitted.

Next, an operation of recording the optical disk at CAV in this invention will be explained concretely. It is necessary to rotate a motor 15 at a fixed rotational speed in the CAV recording. For the motor 15, normally used is a brushless motor such that positions of magnetic poles are detected with Hall devices built in the motor, and direction and the quantity of a current that is made to flow in a coil is controlled according to detection results. Therefore, the driver circuit 14 for driving the motor 15 is normally provided with a function of generating a pulse signal of a frequency proportional to the rotational speed of the motor (hereinafter referred to as "rotational speed signal 40") based on signals obtained from the Hall devices. Then, the reproduction-system signal processing circuit 7 that is provided with a function of controlling the motor 15 conducts feedback control of the control signal of the motor 15 so that this rotational speed signal 40 becomes a predetermined frequency, and thereby can rotate the motor 15 at a fixed rotational speed.

Now, in the CAV recording, while the linear velocity at which the track is scanned varies depending on a radius of a position on the disk in which the information is recorded, linear density of the data on the CD-R disk after the recording must be constant. Because of this, during the recording, the quantity of data recording per unit time, namely a data recording rate, varies depending on the radius of the recording position. Therefore, in order to perform the data recording correctly, it is mandatory for the apparatus to know a suitable data recording rate and adjust the actual recording rate to this.

According to this invention, the suitable data recording rate is known from the address information whose reliability is higher than that of the wobble signal, so that the CAV recording is made to be realized. Hereafter, a method for deriving the data recording rate according to this invention will be explained.

Note that what is actually needed is a real data recording rate Rr, but the standard data recording rate Rs is constant, and hence all that is needed is just to obtain a ratio of the two rates k=Rr/Rs.

In the method for deriving the data recording rate according to this invention, first the standard linear velocity of the disk Vs is obtained. That is, a frequency of the wobble signal $fw_0$ at a known disk radius r0 is measured, then the standard linear velocity of the disk Vs is found by the following equations:

$$Vr_0 = 2\pi r_0 \times N$$

where N=disk rotational speed, and $$Vs = Vr_0 \times (fs/fw_0)$$

where fs=standard wobble frequency. As described above, it is difficult to measure the wobble signal during the recording because of the increased noise. The measurement of $fw_0$ to find the Vs in this relation is not necessarily required to be conducted during the recording and it may be conducted during the reproduction. The wobble signal during the reproduction has less noise and the measurement of the frequency can be done easily, so there is few problem in the measurement of Vs. Moreover, although it is necessary to know the disk rotational speed N in order to calculate Vs, the spindle control system controls, by itself, N to become a fixed rotational speed, as described above; therefore, as long as N is controlled normally, the value of N is distinct. Therefore, Vs can be calculated from these procedures.

Next, the real data recording rate Rr is obtained. Incidentally, this processing is conducted in the recording-position detection circuit 24 from the address information 22 that was detected by the address-information detection circuit 21 and the disk information 17, and the result is outputted as the data-recording-position information 25.

Here, assuming known address information $T_1$ at a known radius $r_1$ as a reference, a radius $r_2$ when recording the information at a position of address $T_2 = T_1 + \Delta T$ is designated as $r_2 = r_1 + \Delta r$. Generally, since a distance L between $T_1$ and $T_2$ is expressed as $L = Vs \times \Delta T$ and $\Delta r$ is obtained uniquely from an equation $\Delta r = F(r_1, L, Tp)$ (where Tp is a track pitch), $r_2$ can be found assuming that Tp is known. Then next, using a relationship $$Vr = (2\pi r_2 N),$$

Vr can be obtained.

Note that, for the address information $T_1$ at the starting radius $r_1$, the standard etc. stipulate a radius at which a specific address information (for example, 0 minute, 0 second, 0 block) exists, so it is desirable to measure this and use it. Moreover, for the measurement of the track pitch Tp, for example, Tp may be calculated from a result of measuring a distance when the optical head is made to travel for a predetermined number of tracks using a travel distance detection encoder that is used for accessing. Alternatively, Tp may be calculated from a result of counting the number of tracks that was traversed by the optical head when the optical head is made to travel for a predetermined distance mechanically using a stepping motor etc.

By the way described above, a value of Rr at a position concerned can be obtained from the address information. As described above, calculating these values needs measuring of values required in the calculation, processing of condition setting as preparation for execution of the measurement, etc. For this purpose, in this invention, a microcomputer and software are used to conduct the above-mentioned processing. Needless to say, these pieces of processing may be conducted solely by hardware, not by software. Any measure will do provided that it can calculate Rr.

Next, a method for obtaining the clock-frequency setting information 27 using the clock-frequency calculation circuit 26 based on Rr obtained as the data-recording-position information 25. Specifically, this processing is processing of detecting a preset value of the recording-system clock frequency that is to be used actually after calculating the target recording-system clock frequency. Since the target clock frequency is merely a numerical value derived by calculation, it may be a frequency that cannot be generated in an actual clock generation circuit. In such a case, there does not occur any problem if the recording-system clock frequency can be set to a frequency sufficiently close to the target recording-system clock frequency. Hereafter, a method for setting the recording-system clock frequency will be explained.

First, an allowable level of a frequency error between the target recording-system clock frequency and the recording-system clock frequency will be explained. Generally, when the optical disk is loaded on the recording apparatus, it is quite unlikely that a virtual center of the optical disk coincides with a virtual center of the turn table completely and there occurs some amount of discrepancy. Here, this discrepancy is called eccentricity. In a disk holding mechanism of a normal recording apparatus, eccentricity of an order of 100 μm may occur easily. If there is the eccentricity, the distance between the virtual centers of the light spot and of the turn table varies sinusoidally in a single rotation; therefore, the linear velocity during the rotation varies similarly even if the rotational speed of the spindle motor is fixed. Consequently, a recording-system clock frequency will also vary sinusoidally in a single rotation according to the eccentricity. For example, if there exists eccentricity of ±100 μm at a position of a radius of 30 mm, the radius varies from 29.9 mm to 30.1 mm and accordingly a variation width of the recording-system clock frequency becomes (±100 μm/30 mm)×100=±0.33%.

Next, variation in the rotational speed of the spindle motor will be explained. Although the spindle motor is so controlled that the rotational speed becomes almost constant when the CAV control is being conducted, as described above, microscopically the rotational speed fluctuates. Hereafter, the reason will be explained. For the spindle motor, the three-phase brushless motor is often used, and the Hall devices are used for magnetic pole detection, as described above. Since the Hall device is necessary for each phase, three Hall devices are fitted on locations such that signals from the Hall devices are shifted by 120 degrees to one another. The Hall device signals have jitters from the following factors: this fixing may involves mechanical errors; three Hall devices may vary in sensitivity; there may be variation in magnetization of a rotor made of a permanent magnet; etc. These jitters cause the rotational speed to vary in a single rotation. Generally it is said that this variation measures about ±0.5%.

From the above, the variation in the rotational speed becomes a sum of one that is caused by the eccentricity and one that is caused by the motor itself, and it is necessary to allow for variation of about 1%. It is difficult to suppress microscopic variation in the rotational speed like this by means of the control of the rotational speed, and it is inferred that there exists the variation of the same order regardless of the CAV control and the CLV control. This fact may be said in other words: although also in the conventional recording apparatus for performing the CLV recording, the variation in the rotational speed to this magnitude or so existed, this did not cause any problem from the practical point of view.

Thus, in this invention, the allowable level of the frequency error between the target recording-system clock frequency and the recording-system clock frequency is set to a maximum of ±1%, and preferably ±0.3% that is comparable to part of variation caused by the eccentricity is set as a measure.

Then, in order to set the recording-system clock frequency so that the error between itself and the target recording-system clock frequency may become ±1% or less, a measure of the frequency resolution of the clock generation circuit becomes ±0.5% or less, to be on the safe side.

Figure 3:
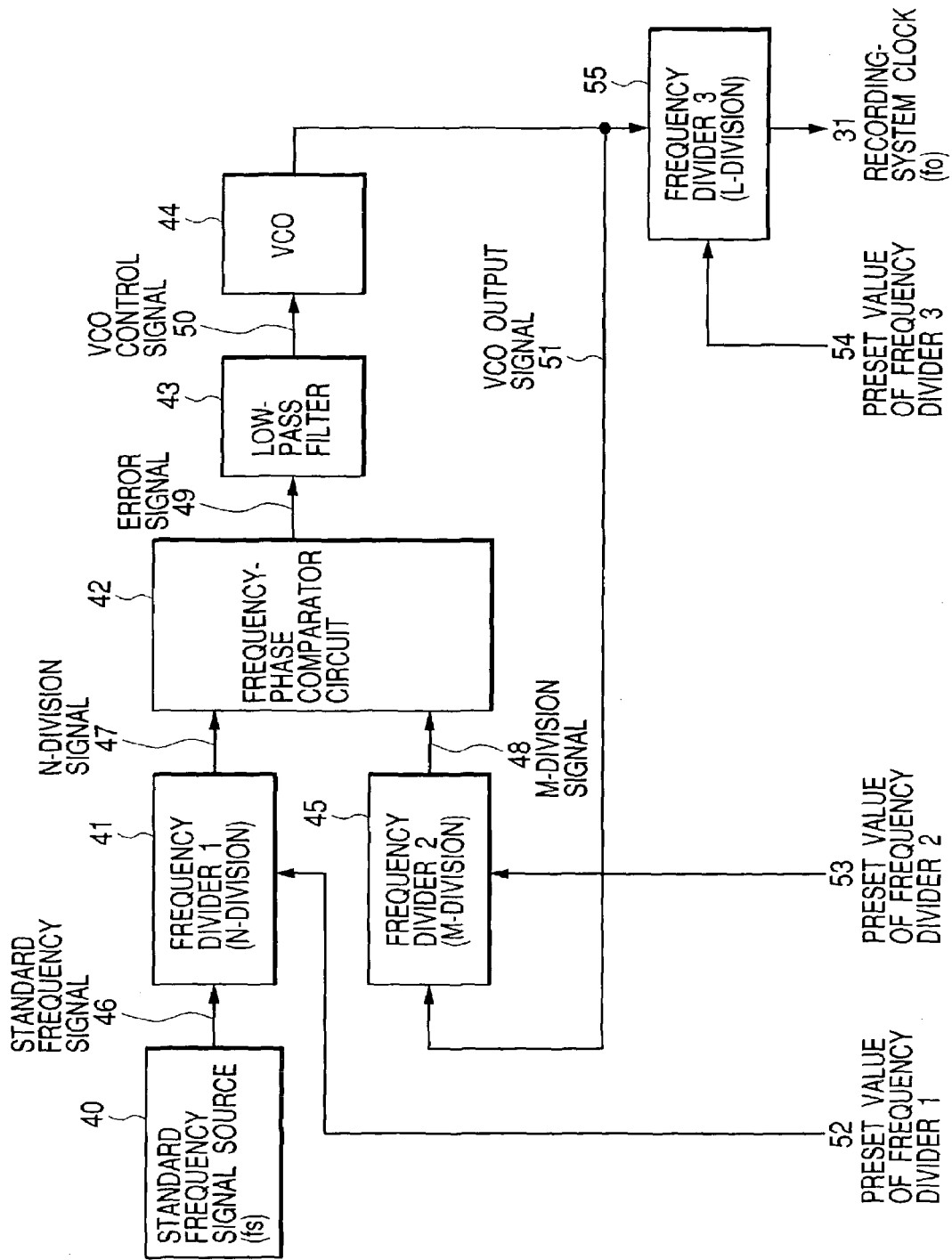
FIG. 3 is a block diagram of a frequency synthesizer used in a clock generation circuit 30.

Next, a concrete method for designing the clock generation circuit 30 will be explained. Conventionally the clock generation circuit can be realized with the use of a circuit known as the frequency synthesizer conventionally. FIG. 3 shows the block diagram of the frequency synthesizer to be used in the clock generation circuit 30. The frequency synthesizer is a circuit for obtaining a signal of a frequency fo=fs×(M/N)×(1/L) (where M and N denote natural numbers) at its output when a signal of a standard frequency fs is inputted therein, and fo can be changed by changing L, M, and N that are set in an internal frequency divider.

Hereafter, the frequency synthesizer will be explained referring to FIG. 3. A standard frequency signal source 40 is a signal source (oscillator device) whose frequency is stable, such as a quartz oscillator or a ceramic oscillator, and a standard frequency signal 46 outputted therefrom is converted to N-division signal 47 by a first frequency divider that divides a frequency of the signal 46 by N. VCO044 is a voltage-controlled oscillator and is capable of changing a frequency of the VCO output signal 51 by the VCO control signal 50. The VCO output signal 51 is subjected to frequency division at the second frequency divider 42 to become an M-division signal 48.

The N-division signal 47 and the M-division signal 48 are inputted to the frequency phase comparator circuit 42, and an error signal 49 that corresponds to differences in frequency and phase between the two signals is outputted. The error signal 49 is inputted to a low pass filter 43, where a high-frequency component of the error signal 49 is attenuated, and a VCO control signal 50 is obtained. Moreover, a division ratio N of the first frequency divider 41 can be set by a preset value 52 of the first frequency divider 41, a division ratio M of the second frequency divider 45 can be set by a preset value 53 of the second frequency divider 46, and a division ratio L of the third frequency divider 55 can be set by a preset value 54 of the third frequency divider 55.

The frequency synthesizer is a kind of feedback control system, where the oscillation frequency fvco of VCO44 is controlled so as to satisfy fs/N=fvco/M. Therefore, a frequency of the VCO output signal 51 becomes fvco=fs×(M/N). Moreover, a frequency of the recording-system clock frequency becomes fo=fvco×(1/L)=fs×(M/N)×(1/L). Then, setting the frequency division ratios L, M, and L allows signals of a wide variety of frequencies to be generated.

Therefore, in order to set the frequency resolution of the clock generation circuit that uses the frequency synthesizer to ±0.5% or less, it is necessary to design the circuit so that a desired recording-system clock frequency can be obtained by setting at least either M or N to a value equal to or more than 100 in its range of use to effect reduction of the change rate of the recording-system clock frequency to 1% or less when the preset value changes by unity.

As an example, calculated is necessary setting in the case where fo is varied from 4.3218 MHz to 10.3723 MHz with L=1 and fs=33.8688 MHz. The results are obtained as follows: with (M, N)=(39,306), fo=4.3166 MHz; with (M, N)=(39,305), fo=4.3308 MHz; with (M, N)=(39,128), fo=10.3494 MHz; and with (M, N)=(39,127), fo=10.4007 MHz. With this setting, the amount of frequency change between neighboring preset values becomes as follows: a change from (M, N)=(39,306) to (39,305) causes the frequency variation of 0.33% (±0.165%); and a change from (M, N)=(39,128) to (39,127) causes the frequency variation of 0.79% (±0.395%). Consequently, frequency resolution equal to the target frequency resolution ±0.5% or less can be realized in a necessary range.

By the processing described in the foregoing, the clock-frequency calculation circuit 26 calculates the clock-frequency setting information 27.

Now, the actual setting of the recording-system clock frequency according to this invention is conducted by calculating the target recording-system clock frequency based on the detected address information. Normally, since the address detection is conducted at all times; if the address is detected correctly, setting of the recording-system clock frequency can be conducted at all times. Moreover, if it is done so, the error of the recording-system clock frequency during the recording can be maintained at a minimum. However, as made clear by the above consideration, if the clock frequency is within its allowable error, there does not occur a practical problem. Moreover, in reality the address cannot be detected correctly at all times during the recording, and sometimes an erroneous address is detected. Therefore, it is not advantageous to increase the updating frequency of the clock frequency with the purpose of decreasing the frequency error, but it is important to increase the reliability of the address information and update the recording-system clock frequency to a correct one at all times instead.

Next, processing that the clock-updating timing output circuit 23 conducts to output the clock-frequency-updating timing information 28 will be explained. In this invention, regarding the updating frequency of the clock frequency, it is configured that, when either address information upon which the updating is scheduled to be conducted beforehand or address information after that address is detected, the recording-system clock frequency is updated to one that corresponds to the detected address information. A case of CD-R will be explained as a concrete example. The address information of CD-R is arranged in a line in an order of minute, second, and block. Assume that, when a value of the second exceeds either 0 second or 30 seconds, the updating is conducted. In this case, if the address information can be read correctly, when it coincides with either 0 second or 30 seconds, the recording-system clock frequency is updated. Moreover, if the address information is hard to read, becoming totally unreadable after the updating was done at 0 second, and the address information that can be read for the first time after this is 40 seconds, the recording-system clock frequency is updated by the address information at the 40 seconds. Furthermore, when it becomes 0 second after this updating, updating is conducted again. With these procedures, it is made possible that normally the updating is conducted in stipulated intervals, and when it becomes unreadable, the updating is conducted in a shortest possible interval. Alternatively, as a simpler way, the updating may be conducted at a time when it is successfully detected that a predetermined amount of addresses or more has passed from the address at which the last updating of the clock frequency was done. Moreover, if the address information is hard to read and becomes unreadable after the updating was done at 0 second and if it is at 40 seconds that the address information can be read for the first time after this, the recording-system clock frequency is updated by the address information at 40 seconds. Furthermore, when it becomes 10 seconds after a lapse of 30 seconds from this event, the updating is conducted again.

The clock-frequency setting circuit 29, when inputted the clock-frequency-updating timing information 28, updates the clock-frequency setting information that has been given to the clock generation circuit 30 until that moment to the latest clock-frequency setting information 27.

Because the encoder circuit 32 and the data recording circuit 33 operate with the recording-system clock 31 as a reference, it becomes possible to record the information onto the optical disk 1 at a predetermined data recording rate corresponding to the recording-system clock frequency.

Figure 9:
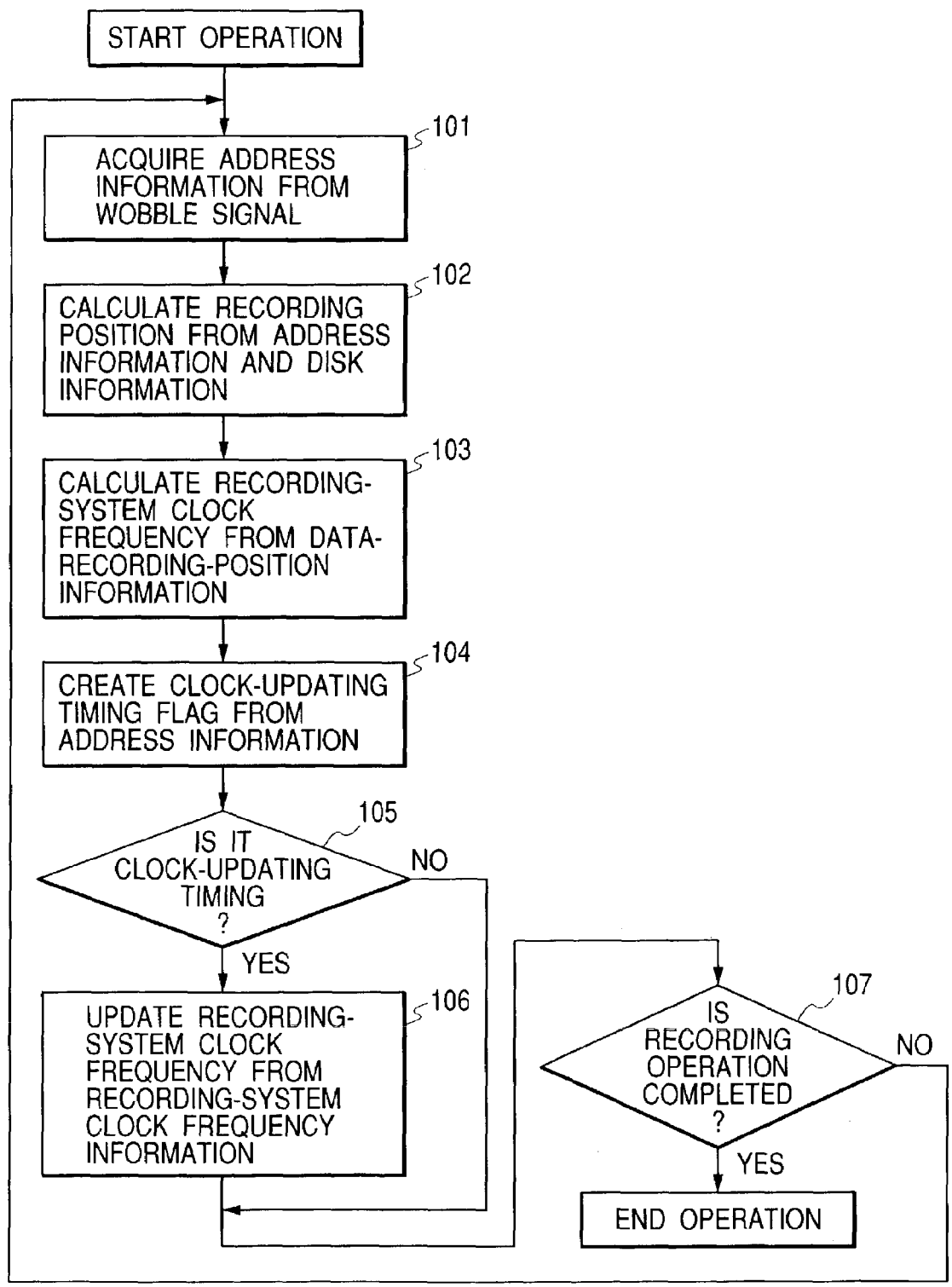
FIG. 9 is a flowchart in the case where a recording-system clock updating in the first embodiment of this invention is conducted by software.

Next, a case where processing as far as outputting the clock-frequency setting information 27 and the clock-updating timing information 28 based on the wobble signal 6 and the disk information 17 of this embodiment is conducted by software with the use of a microcomputer etc. will be explained. FIG. 9 shows a flowchart in the case of conducting above-mentioned processing by software with the use of a microcomputer etc. When the operation is started, first the address information is acquired from the wobble signal (Step 101). In practice, processing of decoding the address information from the wobble signal is conducted by the signal processing circuit, and completion of the decoding is detected by the microcomputer using an interrupt signal etc. Upon detection of the interrupt signal, the microcomputer acquires the address information from the signal processing circuit. Next, the recording position is calculated by using a relational expression of the address information and the disk information (Step 102). Next, the recording-system clock frequency is calculated based on the recording-position information (Step 103). This can be calculated using a relational expression of the recording-system clock frequency and the recording-position information, as in the case of the calculation of the recording position. Next, a clock-updating timing flag is created from the address information (Step 104). Whether or not it is clock-updating timing is checked based on the clock-updating timing flag (Step 105). If the checking indicates that it is the updating timing, recording-system clock frequency setting is updated (Step 106). If it is not the updating timing, the updating is not done. Next, whether or not the recording operation is completed is checked (Step 107). If the checking indicates that the recording operation is completed, the processing is finished; if the recording operation is not completed, the processing from Step 101 through Step 107 is repeated again. The processing by software in this embodiment is characterized in that a circuit scale of the recording-system signal processing circuit 20 can be reduced by a software adjustment of the recording system clock, and even when there occurs a change of the recording-system clock updating procedure, alteration can be done easily. Note that also in the case of the processing by software, since the frequency of the clock updating is the same as that of the embodiment of FIG. 12, the frequency error of the recording-system clock will not exceed the allowable error, as described above.

Figure 15:
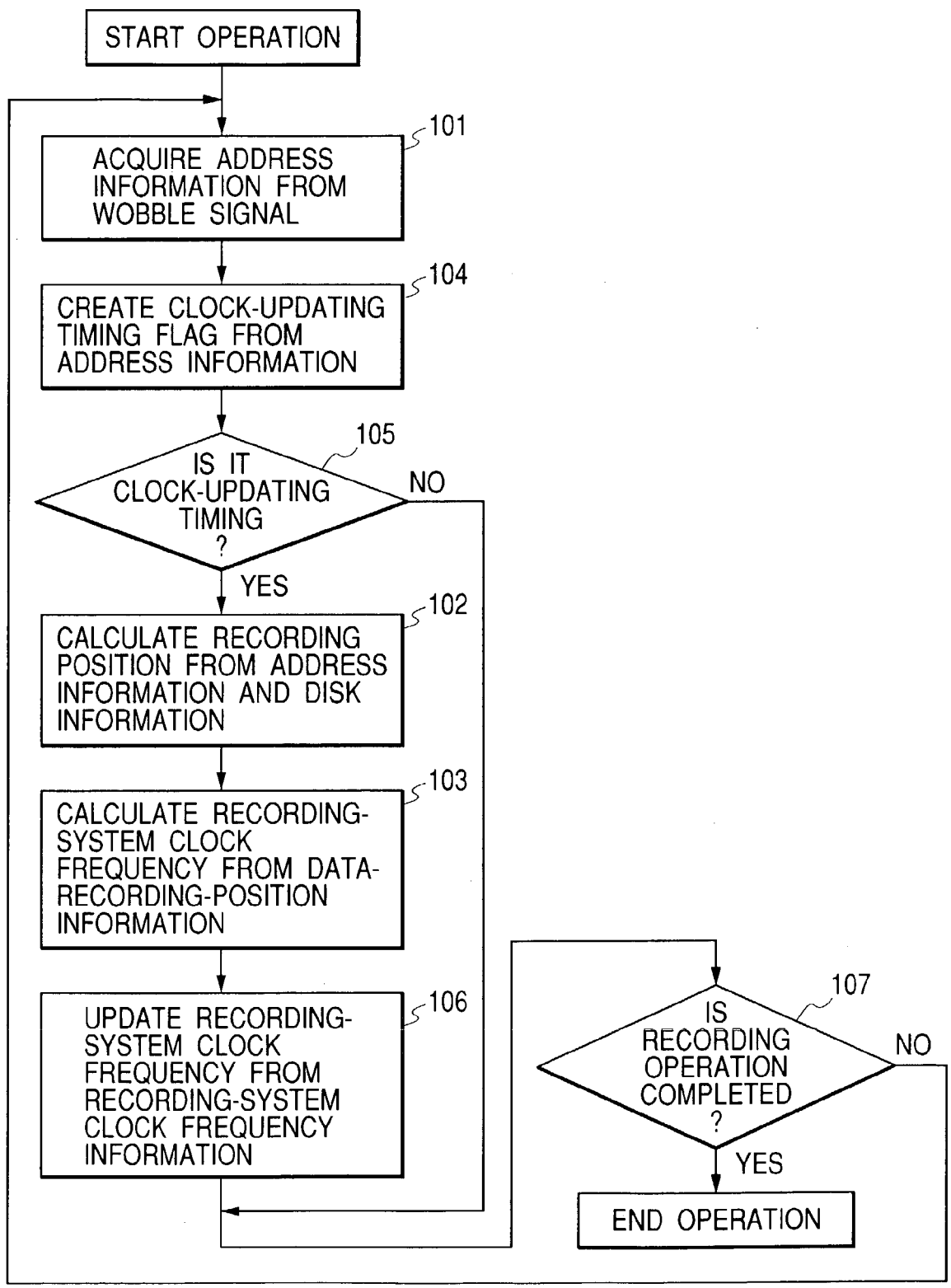
FIG. 15 is a flowchart in the case where a recording-system clock updating in the first embodiment of this invention is conducted by software.

Although in the embodiment of FIG. 9, calculation of the recording position (Step 102) and calculation of the clock frequency (Step 103) are conducted before check of the clock-updating timing (Step 105), it is not necessary to execute Step 102 and Step 103 before Step 105 by all means because Step 105 conducts the processing based on the address information acquired at Step 101. Therefore, the sequence of Step 105 and a set of Step 102 and Step 103 can be altered. That is, only when the result of the check of the clock-updating timing (Step 105) is updating timing, Step 102 and Step 103 may be conducted. FIG. 15 shows a flowchart in the case where the sequence of a set of Step 102 and Step 103 is altered with Step 105, and these steps are processed with the software. Since the difference between FIG. 15 and FIG. 9 is only a sequence of processing and other respects except this point are the same as those of FIG. 9, the description thereof is omitted. In reality, Step 102 and Step 103 require complicated calculus, and if these pieces of processing are conducted by software, it will be a large load. The load of processing in the embodiment of FIG. 9 and that in the embodiment of FIG. 15 are compared assuming that the clock updating interval is 30 seconds. Since the acquisition interval of the address information is $1/75$ second for CD; in the embodiment of FIG. 9, Steps 102 and 103 are processed 75×30=2250 times for a period of 30 seconds, whereas in the embodiment of FIG. 15, Steps 102 and 103 will be processed once only when it is the updating timing, and hence the number of times of Steps 102 and 103 can be reduced largely as compared to the embodiment of FIG. 9. Therefore, the embodiment of FIG. 15 is characterized by being capable of mitigating the load of the processing by software as compared to the embodiment of FIG. 9. Moreover, the embodiment of FIG. 15 can be modified so that the processing is conducted by hardware, and in that case it will be characterized by being capable of reducing power consumption as compared to the embodiment of FIG. 1. Note that, since the frequency of the clock updating in the embodiment of FIG. 15 is the same as that in the embodiment of FIG. 1, the frequency error does not exceed the allowable error, as in the case of the embodiment of FIG. 9.

Figure 4:
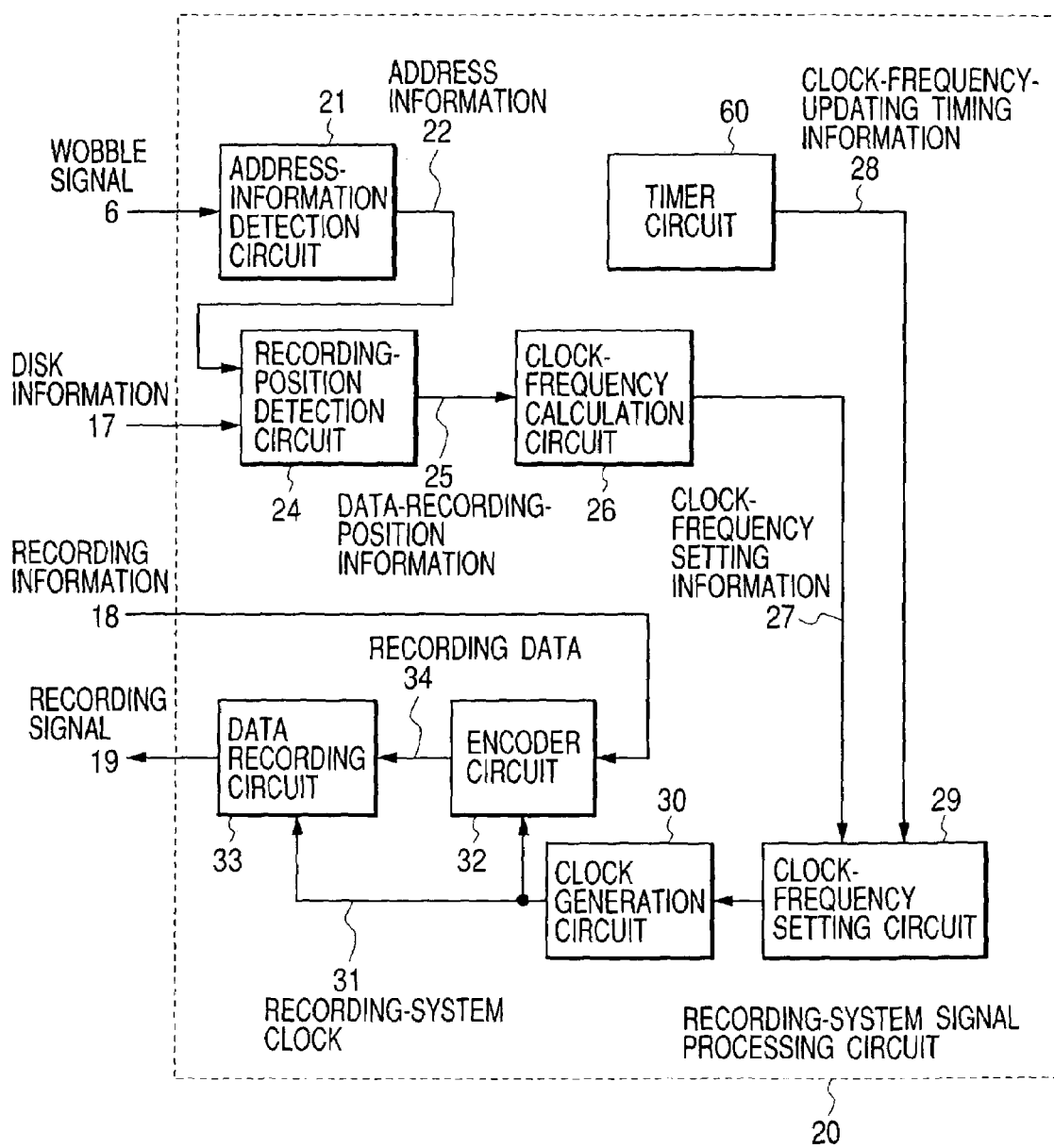
FIG. 4 is a block diagram of the recording-system signal processing circuit 20 in a second embodiment of this invention.

Next, the second embodiment of this invention will be described referring to the drawings. FIG. 4 shows a block diagram of the recording-system signal processing circuit 20 in the second embodiment of this invention. A difference between this embodiment and the first embodiment will be explained. While in the first embodiment the clock-frequency-updating timing information 28 is generated by the clock-updating timing output circuit 23 based on the address information 22 by the above-mentioned method; in this embodiment, the clock-frequency-updating timing information 28 is generated by the timer circuit 60 that takes the place of the clock-updating timing output circuit 23. That is, with start of the recording, the timer circuit 60 is activated, and thereafter every time a predetermined time that is set in the timer circuit 60 elapses, the clock-frequency-updating timing information 28 is outputted.

As a feature of this embodiment, since updating of the recording-system clock frequency does not depend on the detection of the address information 22, the circuit becomes simple and hence the updating can be conducted apparently in the intervals of a predetermined time even when the address is hard to read. Note that since other respects except the above-mentioned point are the same as those of the first embodiment, description thereof is omitted.

As in the case of the first embodiment, it is also possible to modify this embodiment into a form where processing of outputting the clock-frequency setting information 27 and the clock-updating timing information 28 is conducted by software with the use of a microcomputer etc. A case where this embodiment is modified in such a way that processing is conducted by software with the use of a microcomputer etc. will be explained. A difference between this variant and the variant of the first embodiment where the processing is conducted by software shown in FIG. 9 will be explained. While in FIG. 9 the clock-updating timing flag creation (Step 104) is conducted based on the address information; in this embodiment, the clock-updating timing flag is created at predetermined time intervals. In reality, the clock-updating timing flag may be created by means of timer interruption of a microcomputer etc. Since other respects except the above-mentioned point are the same as those of the embodiment of FIG. 9, description thereof is omitted.

Figure 5:
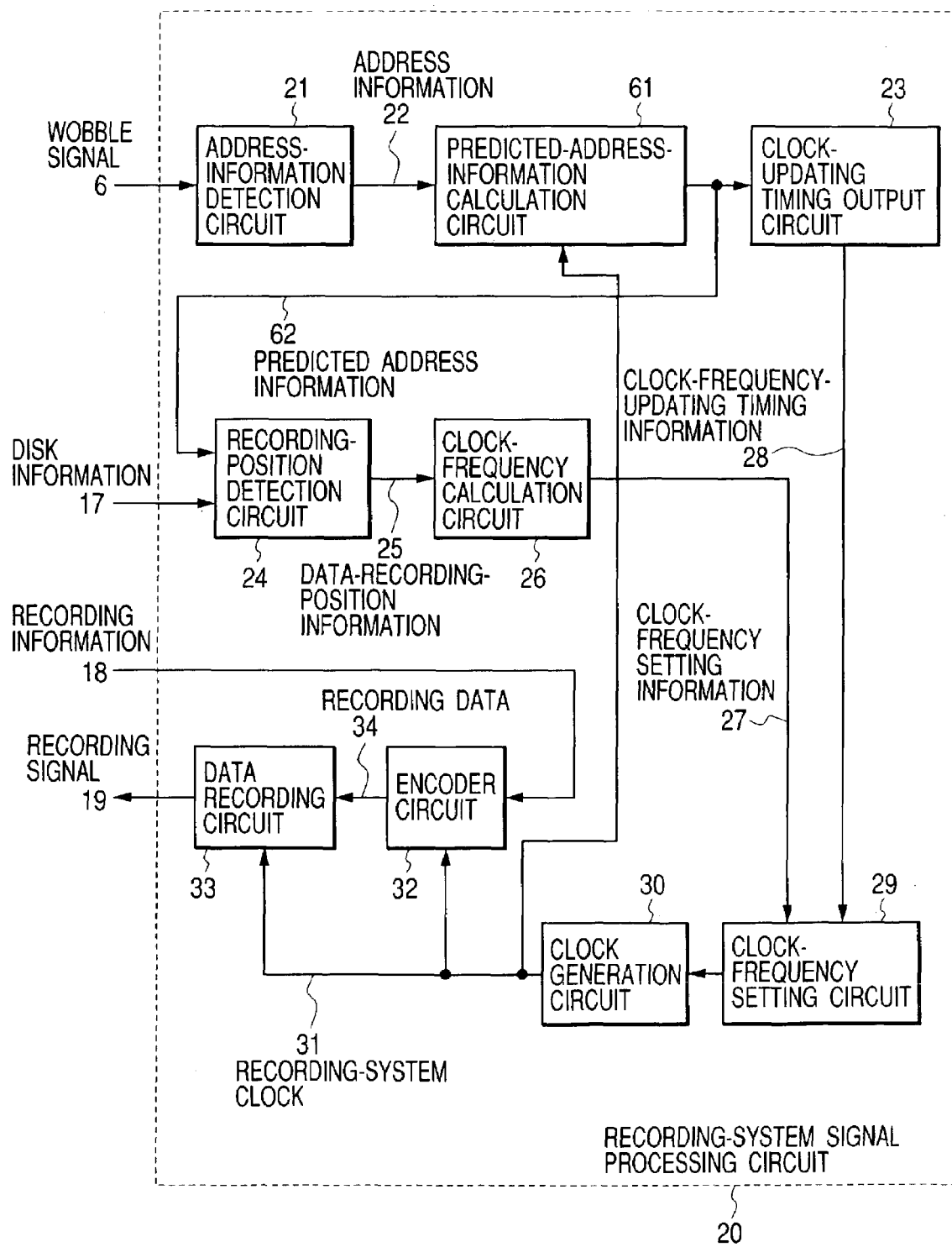
FIG. 5 is a block diagram of the recording-system signal processing circuit 20 in a third embodiment of this invention.

Next, the third embodiment of this invention will be described referring to the drawings. FIG. 5 shows a block diagram of the recording-system signal processing circuit 20 in the third embodiment of this invention. A difference between this embodiment and the first embodiment will be explained. While in the first embodiment, the clock-frequency-updating timing information 28 and the data-recording-position information 25 are formed based on the address information 22; in this embodiment, the clock-frequency-updating timing information 28 and the data-recording-position information 25 are formed based on the predicted address information 62. A predicted-address-information calculation circuit 61 is a circuit that predicts the address information from the address information 22 and the recording-system clock 31 at some time point in the past. The principle thereof makes use of a fact that the amount of data recorded is known by counting the recording-system clock 31, and the amount of data recorded between unity addresses is constant. That is, assuming that a value obtained by counting the recording-system clock 31 from an origin of arbitrary address A0 after the recording is started as Nc, the number of the recording-system clock contained between unity addresses as Na, and that Nc/Na=$\Delta$p, the address information is obtained by A1=A0+$\Delta$p provided that $\Delta$p becomes an integer. Therefore, if one knows the address A0 that was detected when the reliability of the address information is high and a count value of the recording-system clock from address A0 to address A1, the one can specify the address A1. This embodiment has a feature that, once a correct address is obtained, theoretically the address information can be predicted even when no address information is obtained at all after that, and therefore even in the case where the reliability of the address information is low and correct address information is hard to obtain, the predicted address can make up for this. Note that since other respects except the above-mentioned point are the same as those of the first embodiment, description thereof is omitted.

As in the case of the first embodiment, it is also possible to modify this embodiment into a form where the processing of outputting the clock-frequency setting information 27 and the clock-updating timing information 28 is conducted by software with the use of a microcomputer etc. A case where this embodiment is modified into a form where the processing is conducted by software with the use of a microcomputer etc. will be described. A difference between this variant and the variant of the first embodiment of FIG. 9 where the processing is conducted by software will be explained. While in FIG. 9 the recording-position calculation (Step 102) and the clock-updating timing flag creation (Step 104) are conducted based on the address information; in this embodiment, the recording position calculation and the clock-updating timing flag creation are conducted based on the predicted address. In reality, the predicted address that is calculated from a value obtained by counting the recording-system clock with a count timer of the microcomputer etc. may be used. Since other respects except the above-mentioned point are the same as those of the embodiment of FIG. 9, description thereof is omitted.

Figure 10:
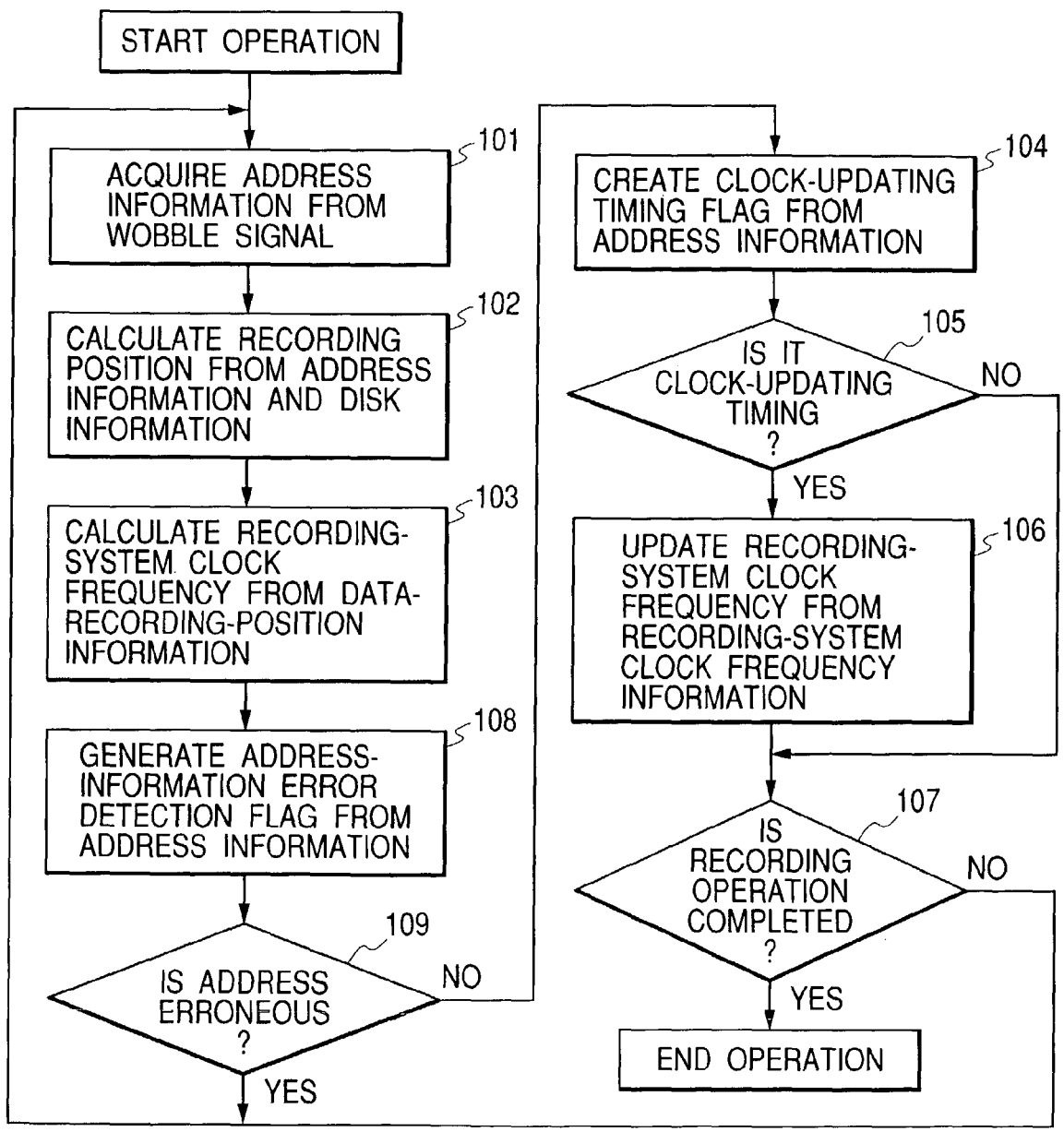
FIG. 10 is a flowchart in the case where a recording-system clock updating in the fourth embodiment of this invention is conducted by software.

Next, the fourth embodiment of this invention will be described referring to the drawings. FIG. 10 shows a flowchart diagram in the case of conducting the processing of the recording-system signal processing circuit 20 in the fourth embodiment of this invention by software with the use of a microcomputer etc. A difference between this embodiment and the first embodiment will be explained. While in the first embodiment the clock-frequency-updating timing check is conducted based on the address information; in this embodiment, whether or not the address information is free from errors is detected, and only when it is judged to be error-free, the clock-frequency-updating timing check is conducted based on the address information. In the error detection of the address information, whether or not the error exists is judged from the detection results of CRC (Cyclic Redundancy Check) and existence of address continuity.

Consequently, only when the error-free address information is obtained, the clock-frequency-updating timing check is conducted; therefore, when the erroneous address information is obtained, the updating of the recording-system clock frequency is not conducted, and hence the recording-system clock frequency can be prevented from being changed to the erroneous recording-system clock frequency. This embodiment has a feature that by means of relatively simple address information error detection, such as CRC (Cyclic Redundancy Code) detection and address continuity detection, erroneous setting of the recording-system clock frequency can be prevented. Here, while in this embodiment, the error detection is judged by the existence of the address error, and the error detection can be judged by the existence of address continuity that was detected. Note that since other respects except the above-mentioned point are the same as those of the first embodiment, description thereof is omitted.

Figure 6:
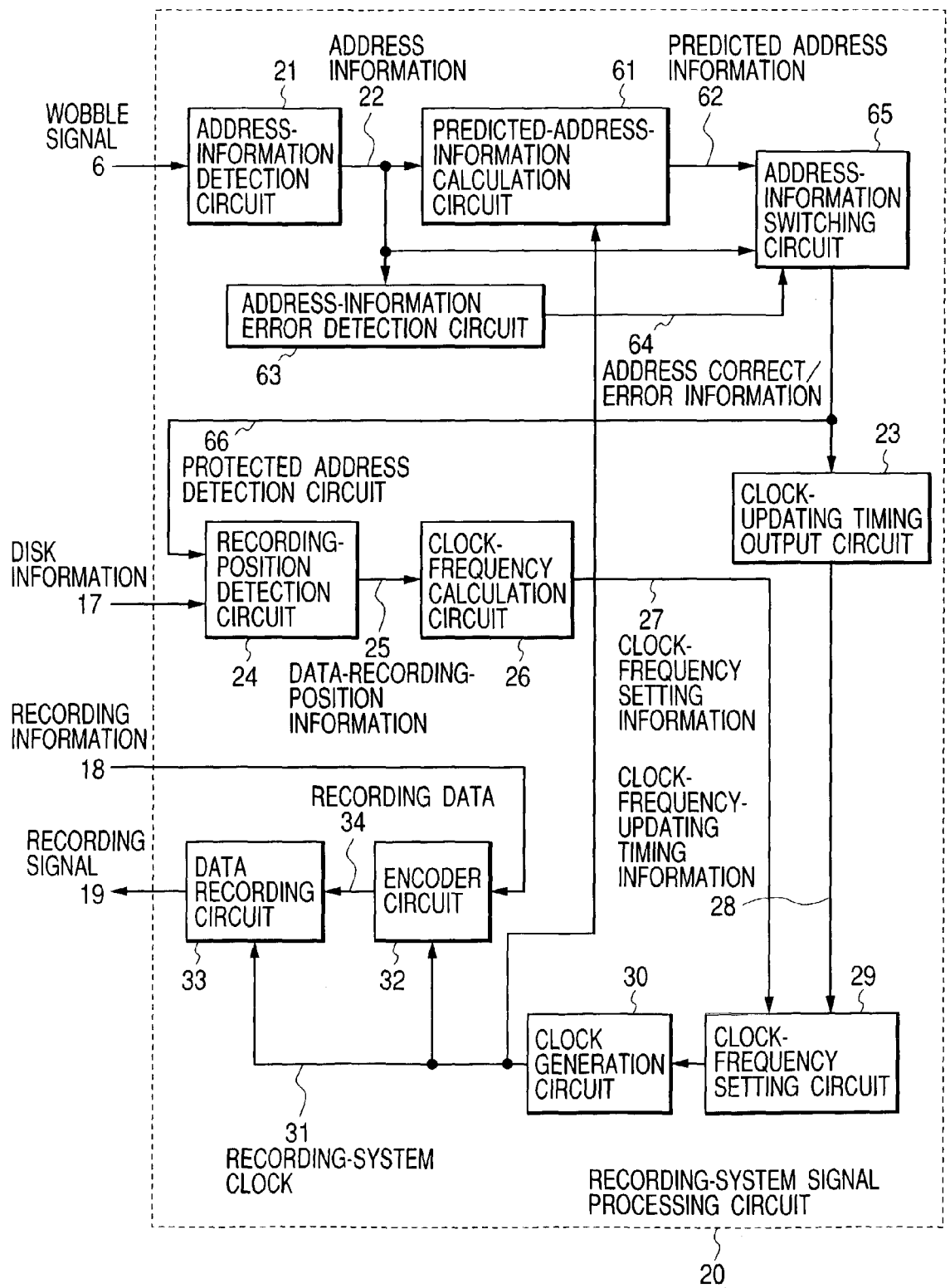
FIG. 6 is a block diagram of the recording-system signal processing circuit 20 in a fifth embodiment of this invention.

Next, the fifth embodiment of this invention will be described referring to the drawings. FIG. 6 shows a block diagram of the recording-system signal processing circuit 20 in the fifth embodiment of this invention. This embodiment is a combination of the third embodiment and the fourth embodiment, and a difference between this embodiment and the third embodiment will be explained. While in the third embodiment, the recording-position detection circuit 24 and the clock-updating timing output circuit 23 use the predicted address information 62; in this embodiment, the recording-position detection circuit 24 and the clock-updating timing output circuit 23 select and use either of the predicted address information 62 or the address information 22 by the address information switching circuit 65 according to the address correct/error information 64 outputted from the address information error detection circuit 63. That is, when the address correct/error information 64 is judged to indicate correctness, the address information 22 is selected; when the address information 64 is judged to indicate error, the predicted address information 62 is used. Then the selected signal is outputted from the address information switching circuit 65 as protected address information 66. Therefore, since the protected address information 66 is such that either the address information 22 or the predicted address information 62 that is error-free is automatically selected and provided according to the address correct/error information 64. Thus, the protected address information 66 can be the address information with high reliability at all times. This embodiment has a feature that the address information with high reliability can be obtained automatically. Note that since other respects except the above-mentioned point are the same as those of the first embodiment, description thereof is omitted.

Figure 11:
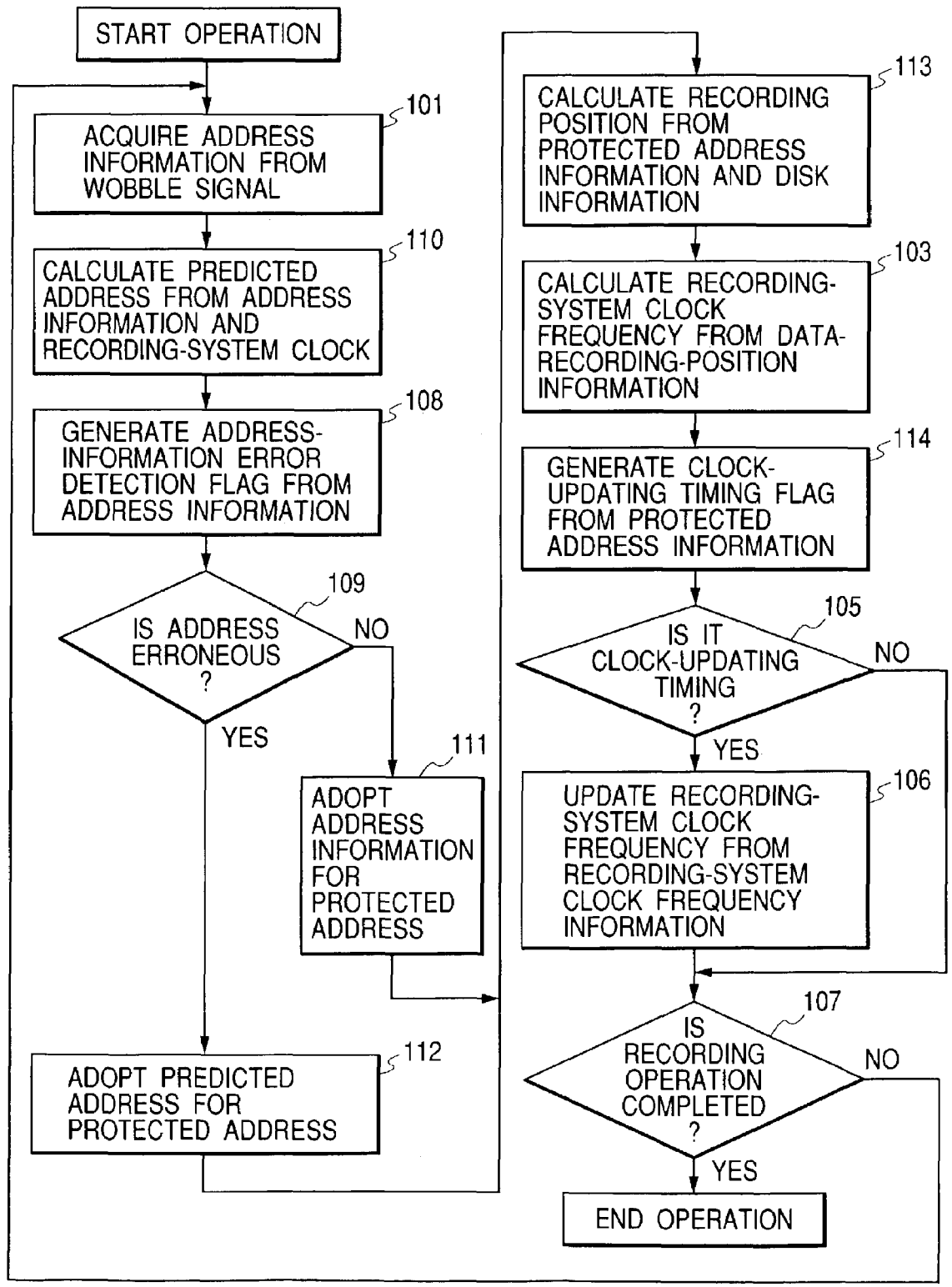
FIG. 11 is a flowchart in the case where a recording-system clock updating in the fifth embodiment of this invention is conducted by software.

As in the case of the first embodiment, it is also possible to modify this embodiment into a form where the processing of outputting the clock-frequency setting information 27 and the clock-updating timing information 28 is conducted by software with the use of a microcomputer etc. FIG. 11 shows a flowchart in the case of conducting the processing of this embodiment by software with the use of a microcomputer etc. Since contents of the processing are the same as those of the embodiment in which the processing is conducted with the circuits, description thereof is omitted.

Figure 7:
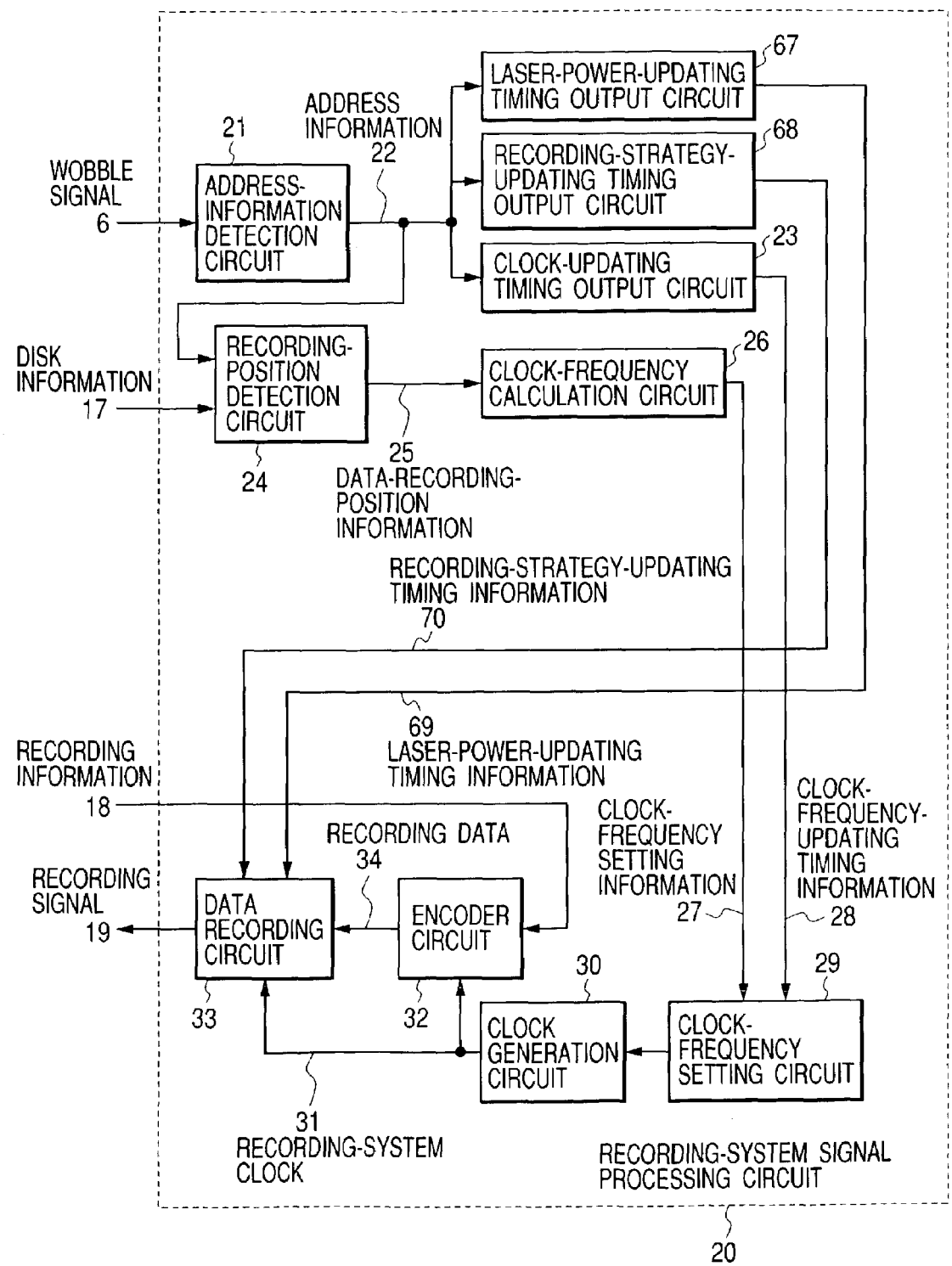
FIG. 7 is a block diagram of the recording-system signal processing circuit 20 in a sixth embodiment of this invention.

Next, the sixth embodiment of this invention will be described referring to the drawings. FIG. 7 shows a block diagram of the recording-system signal processing circuit 20 in the sixth embodiment of this invention. A difference between this embodiment and the first embodiment will be explained. In the sixth embodiment, a laser-power-updating timing output circuit 67 and a recording-strategy-updating timing output circuit 68 are added, and a laser-power-updating timing information 69 and a recording-strategy-updating timing information 70 are outputted from the respective circuits.

Since in the CAV recording, as the radius of the recording position becomes larger, the recording rate and the linear velocity increase; it is necessary to increase the quantity of the emitted light of the laser necessary for recording, erasing, or reproduction of the wobble signal. Moreover, generally in the case when the recording rate varies, it is also necessary to change the recording strategy according to this. Then, in this invention, the data recording conditions, such as the quantity of emitted light and recording strategy at the recording position, are controlled based on the address information 22, whereby the data recording conditions in the CAV recording are controlled finely. A set of the laser-power-updating timing output circuit 67 and the recording-strategy-updating timing circuit 68 has similar functions as those of the clock-updating timing output circuit 23. When the predetermined address information 22 is detected, the circuits 67, 68 output the laser-power-updating timing information 69 and the recording-strategy-updating timing information 70 each for updating one of the recording conditions, such as the laser power and the recording strategy, respectively, which are to be controlled by the respective circuits 67,68. The laser-power-updating timing information 69, the recording-strategy-updating timing information 70, and the clock-frequency-updating timing information 28 are generally independent and outputted at different times. However, these signals may be outputted at the same time in synchronization with one another. In this case, the signals that are outputted at the same time may share the timing circuit with one another. This embodiment has a feature that, since the control system for the recording conditions that is essential in the CAV recording can be shared with the frequency control system of the recording-system clock 31, a circuit scale can be reduced and the control is easy to perform because the control methods are the same. Here illustrated is an example where the laser-power-updating timing output circuit 67, the recording-strategy-updating timing output circuit 68, and the clock-updating timing output circuit 23 are all provided. However, it is needles to say that the configuration may be one that it has only either of the laser-power-updating timing output circuit 67 or the recording-strategy-updating timing output circuit 68. Note that since other respects except the above-mentioned point are the same as those of the first embodiment of this invention, description thereof is omitted.

Figure 12:
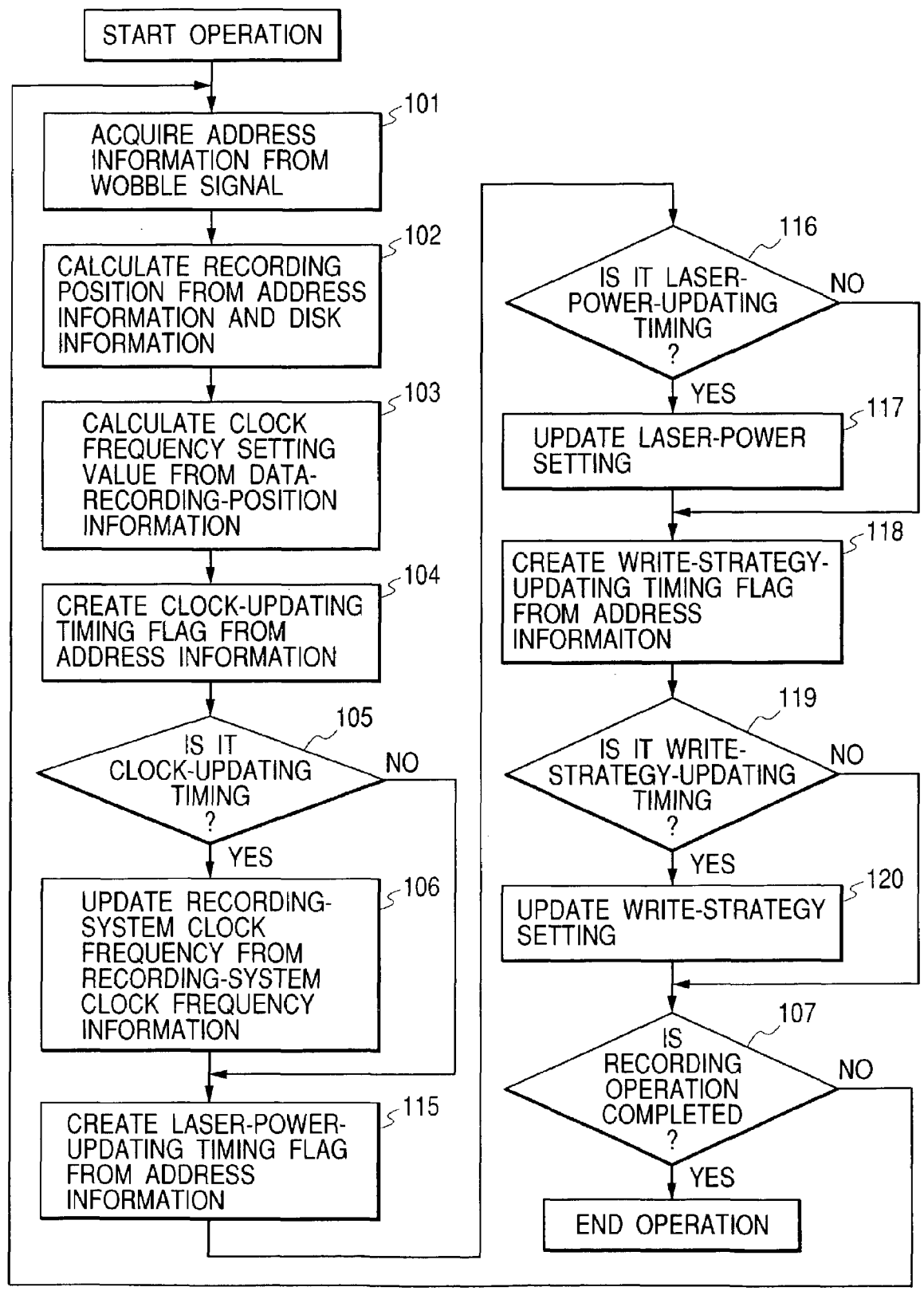
FIG. 12 is a flowchart in the case where a recording-system clock updating in the sixth embodiment of this invention is conducted by software.

As in the case of the first embodiment, it is also possible to modify this embodiment into a form where the processing is conducted by software with the use of a microcomputer etc. FIG. 12 shows a flowchart in the case of conducting the processing of this embodiment by software with the use of a microcomputer etc. Since contents of the processing are the same as those of the case where it is conducted by circuits, description thereof is omitted.

Figure 8:
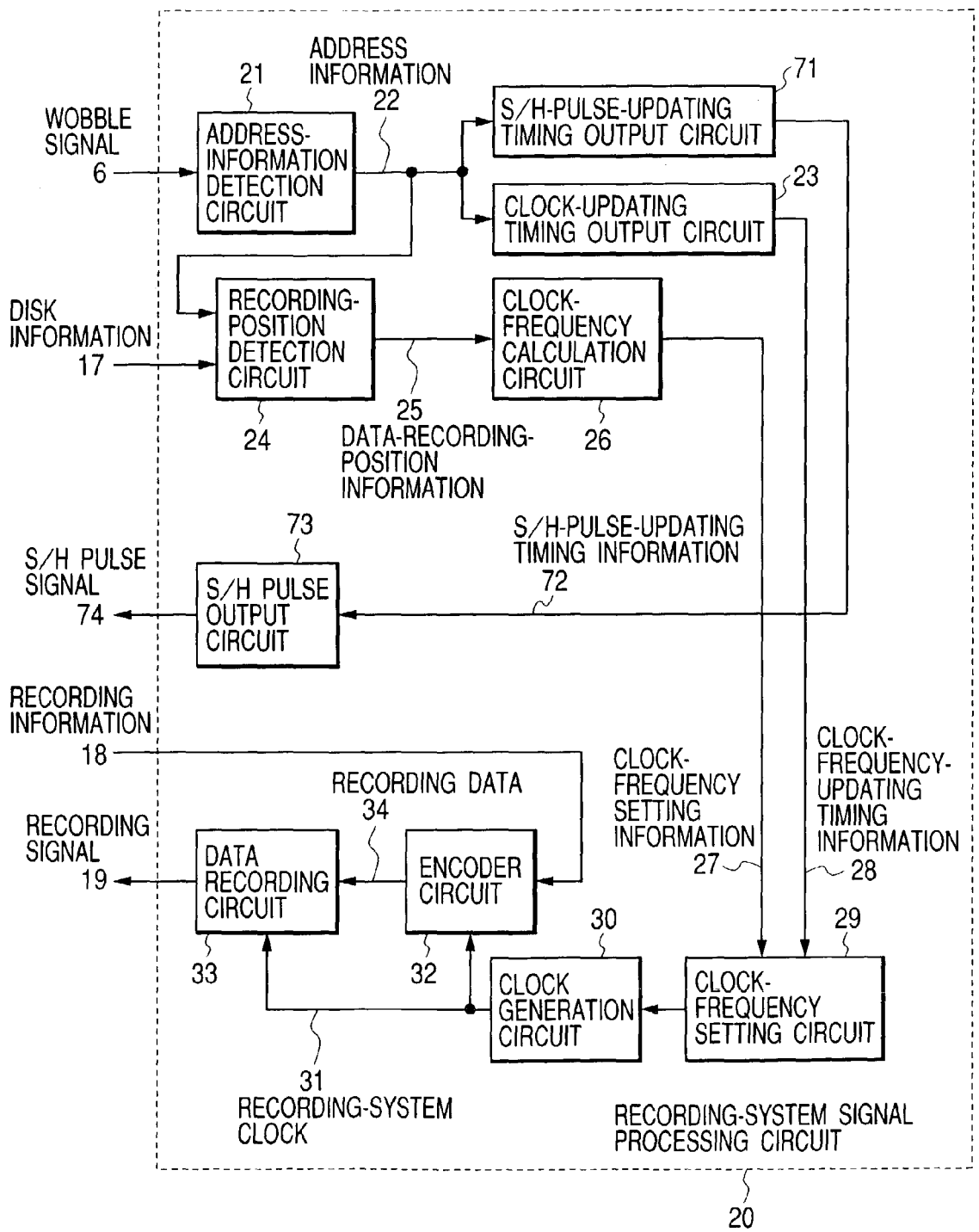
FIG. 8 is a block diagram of the recording-system signal processing circuit 20 in a seventh embodiment of this invention.

Next, the seventh embodiment of this invention will be described referring to the drawings. FIG. 8 shows a block diagram of the recording-system signal processing circuit 20 in the seventh embodiment of this invention. A difference between this embodiment and the first embodiment will be explained. In the seventh embodiment, a sample/hold (hereinafter referred to as S/H) pulse-updating timing output circuit 71, S/H-pulse-updating timing information 72, and an S/H pulse output circuit 73 are added, and an S/H pulse signal 74 is outputted. Moreover, the S/H pulse signal 74 (not shown in the figure) is connected to the front end circuit 3 shown in FIG. 2.

As was also described in the sixth embodiment, in the CAV recording, as the radius of the recording position becomes larger, the recording rate and the linear velocity rise. Therefore, it is necessary to vary the S/H pulse timing in order to sample and hold the servo signal 5 and the wobble signal 6. The reason is explained as follows: During the recording, the laser emits light at a laser power of recording level for a portion where the recording is performed and at a laser power of reproduction level for a portion where the recording is not performed, and accordingly in the signal detected by the optical pick-up, a component of recording power irradiation and a component of reproduction power irradiation are detected alternately. Among these signals, the detected signal generated with the reproduction power needs to be sampled and held. However, when the recording power is changed to the reproduction power, an overshoot occurs in the variation in the detected signal of the optical pick-up 2, and it take a certain time (hereinafter referred to as "delay time") for the signal to be settled. If the delay time is always constant in the CAV recording, it is not necessary to vary the S/H pulse timing. However, in reality, it is necessary to increase the recording power in accordance with the increase of the recording rate, and consequently a difference in level between the recording power and the reproduction power is expanded due to the increase in the recording power, which extends the delay time at the time of switching from the recording power to the reproduction power. Therefore, in order to sample and hold the component of the reproduction power irradiation in all the time, it is necessary to vary the S/H timing according to the increase in the recording power. Then, in this invention, the system is so configured that the reproduction conditions of the servo signal and the wobble signal in the CAV recording are controlled by controlling the S/H pulse timing at the recording position based on the address information 22. The S/H-pulse-updating timing output circuit 71 has similar functions as those of the clock-updating timing output circuit 23, and when the predetermined address information 22 is detected, outputs the S/H-pulse-updating timing information 72 for updating the S/H pulse timing, from which an S/H pulse signal output circuit 73 produces and outputs the S/H pulse signal 74. This embodiment has a feature that stabilization of the servo signal and the wobble signal at the time of the CAV recording can be achieved and thereby the recording quality can be improved through both stabilization of the servo system and stabilization of address signal detection from the wobble signal. Note that since other respects except the above-mentioned point are the same as those of the first embodiment, description thereof is omitted.

Figure 13:
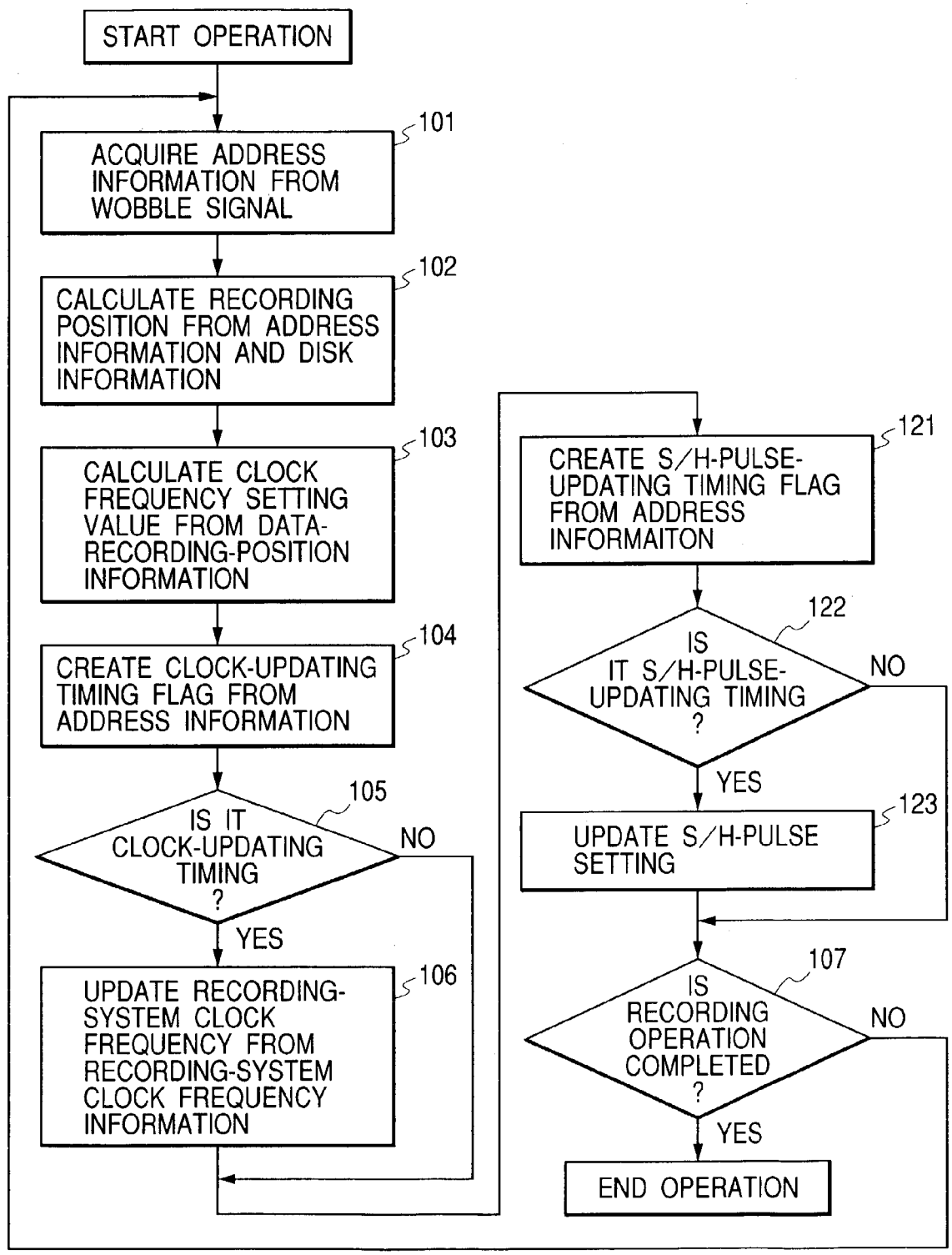
FIG. 13 is a flowchart in the case where a recording-system clock updating in the seventh embodiment of this invention is conducted by software.

As in the case of the first embodiment, it is also possible to modify this embodiment into a form where the processing of outputting the clock-frequency setting information 27 and the clock-updating timing information 28 is conducted by software with the use of a microcomputer etc. FIG. 13 shows a flowchart in the case of conducting the processing of this embodiment by software with the use of a microcomputer etc. Since contents of the processing are the same as those of the case where it is conducted by the circuits, description thereof is omitted.

Figure 14:
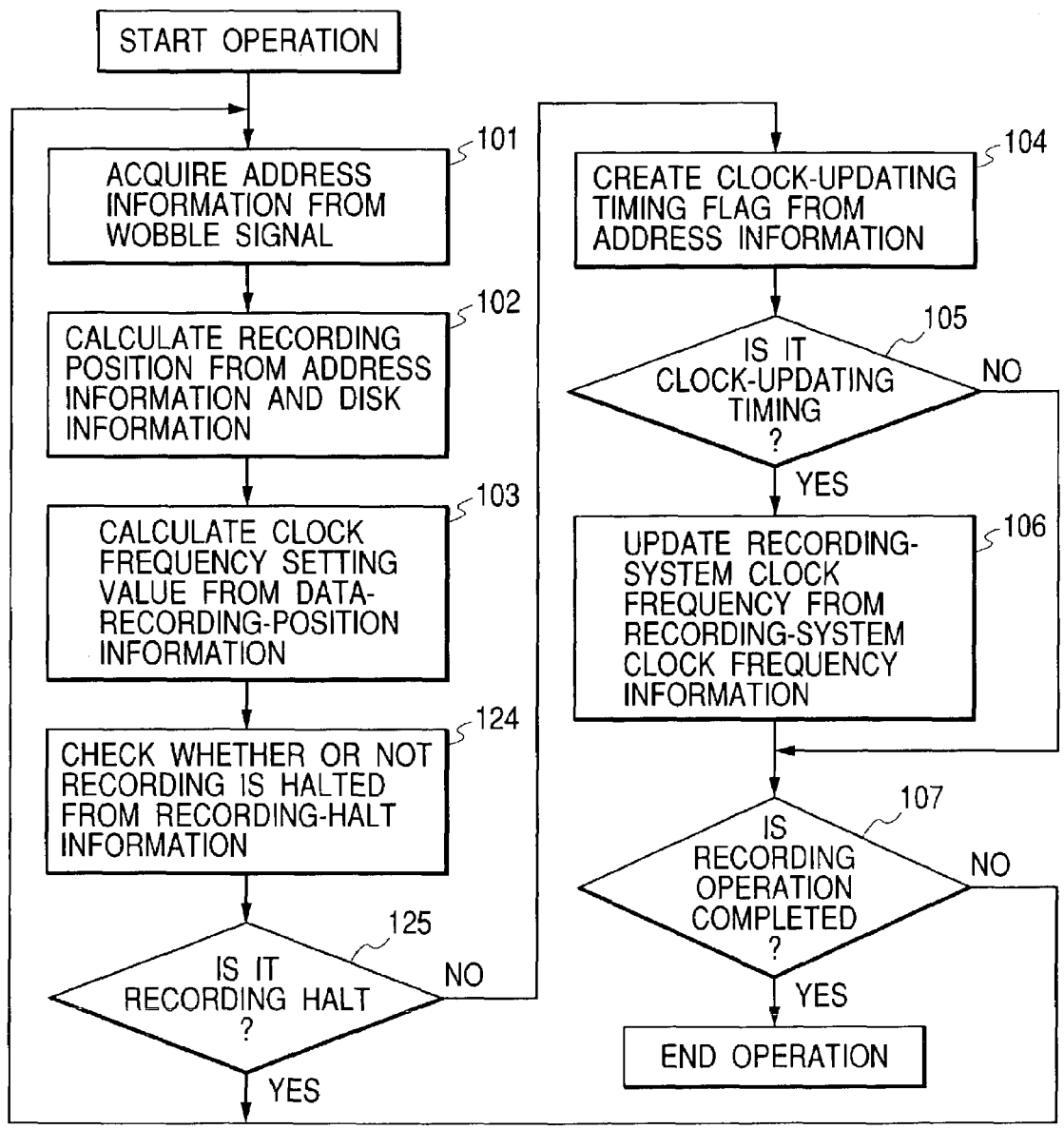
FIG. 14 is a flowchart in the case where a recording-system clock updating in the eighth embodiment of this invention is conducted by software.

Next, the eighth embodiment of this invention will be described referring to the drawings. FIG. 14 shows a flowchart in the case of conducting the processing of the recording-system signal processing circuit 20 in the eighth embodiment of this invention by software with the use of a microcomputer etc. A difference between this embodiment and the first embodiment will be explained. In the eighth embodiment, halt of the recording is detected from recording halt information, and when the operating condition is judged as the halt of the recording, the system is set in such a way that the check of the clock-frequency-updating timing is not conducted based on the address information. The recording halt information (not shown in the figure) is outputted from the interface circuit 10 shown in FIG. 2, and is connected to the recording-system signal processing circuit 20.

There is a case where the halt of the recording operation is required during the recording, which is not limited to the case of the CAV recording. One concrete example is as follows: another processing that does not have any connection with the recording data outputting to the interface circuit 10 occurs in the external circuit 13; due to this, the interface circuit 10 is reduced to a state incapable of outputting continuously the recording information; then the recording data is not buffered in the buffer memory 11; and thereby finally the buffer memory 10 becomes empty. Usually this is called buffer underrun. In this case, since there is no recording data necessary to perform the recording, it is impossible to continue the recording operation, requiring the halt of the recording operation. When the recording operation is halted, the updating of the recording-system clock frequency, which was being performed during the recording operation, is now meaningless, and hence it is preferable to stop the recording-system clock frequency updating. Moreover, assuming that the recording data is buffered in the buffer memory 11 again, the recording operation becomes possible, and that the recording operation is expected to be restarted from the position at which the recording was halted previously; if the clock updating is stopped during the halt of the recording operation, it will be not necessary to conduct the calculation of the clock frequency etc. newly when the recording operation is restarted and all that is necessary is just to restart the clock updating. From these reasons, in this embodiment, when the halt of the recording operation becomes necessary at any time during the recording, the updating of the recording-system clock is stopped during the halt of the recording operation, and when the recording operation is restarted, the clock updating is restarted. In the CLV recording, the recording-system clock is fixed and naturally, it is not necessary to update the clock frequency. On the contrary, since in the CAV recording according to this invention, the recording-system clock is being updated based on the address information 22. Thus, if the recording operation is required to be halted during the recording, whether or not the recording operation is should be halted is judged based on the recording halt information. If the recording operation is to be halted, check of the clock-updating timing is prevented from being conducted. Moreover, if the recording halt information becomes invalid, in order to restart the recording, the updating of the recording-system clock is restarted in synchronization with the restart of the recording. This embodiment has a feature that even in the CAV recording, when the recording operation is halted, the updating of the recording-system clock is stopped, whereby, at the time of restarting the recording from a position where the recording was halted, control of the recording clock is easy to do. Note that since other respects except the above-mentioned point are the same as those of the first embodiment, description thereof is omitted.

It has been described in the foregoing that in the first through eighth embodiments, the updating of the recording-system clock can be conducted by software with the use of a microcomputer etc. In addition to this, it is also possible to apply the idea of the embodiment of FIG. 15 to the second through eighth embodiments as well as to the first embodiment. In these cases, the application can be implemented in each of the embodiments by changing the sequence of processing in such a way that the processing of the recording position calculation and the processing of the clock frequency calculation are conducted only when the clock-updating timing check is done and it is found to be the updating timing, the software processing load can be decreased In the foregoing embodiments, this inventions has been described taking the CAV recording onto the CD-R as examples. The application targets of the present invention are not restricted to the CAV recording. Even when the inventions is applied to the recording based on the ZONE CAV and the ZONE CLV, such a particular effect as improvement of the recording accuracy can be produced as compared to the case of using the recording-system clock resulting from meandering of the wobble.

In addition, since the invention has been described taking CD-R as examples, the address information in the example described above is one that corresponds to ATIP. However, the same effect can be achieved using LPP (Land Pre-Pit) or ADIP (Address In Pre-groove) at the time of recording the recordable DVD.

As described above, this invention provides the optical disk apparatus and the information recording apparatus that excel in stability as compared to a case where the recording-system clock is generated using the wobble signal and hence can achieve the data recording with a recording-system clock signal having less jitters. Consequently, this invention can reduce the error rate at the time of reproducing the recorded signal and achieve the improvement of the reliability in the whole system of data recording and data reproduction.

What is claimed is:

1. An optical disk apparatus capable of recording information optically on a recordable optical disk whose track is formed in a wobble format, comprising:
   driving means for driving the recordable optical disk rotationally;
   detecting means for detecting address information recorded on the recording track,
   an oscillator element for oscillating a signal of a specific frequency,
   recording-system clock generating means for generating a recording-system clock used when recording the information onto the recordable optical disk using the signal from said oscillator element as a reference;
   clock-updating timing outputting means for outputting a clock-updating timing output signal used for switching the recording-system clock based on the address information;
   monitoring means for monitoring continuity of the address information; and
   address-information generating means for generating the address information,
   wherein, if as a result of monitoring by the monitoring means the detected address information does not have the continuity, the recording-system clock used when recording the information onto the recordable optical disk is generated based on the address information generated by the address-information generating means and an output signal of the oscillator element.

2. The optical disk apparatus according to claim 1, wherein, when recording the information onto the recordable optical disk, the recording is performed by a CAV method based on the recording-system clock.

3. An optical disk apparatus capable of recording information optically on a recordable optical disk whose track is formed in a wobble format, comprising:
   driving means for driving the recordable optical disk rotationally;
   detecting means for detecting address information recorded on the recording track,
   an oscillator element for oscillating a signal of a specific frequency,
   recording-system clock generating means for generating a recording-system clock used when recording the information onto the recordable optical disk using the signal from said oscillator element as a reference;
   clock-updating timing outputting means for outputting a clock-updating timing output signal used for switching the recording-system clock based on the address information;
   error detecting means for detecting an error of the address information; and
   address-information generating means for generating the address information,
   wherein, if as a result of error detection by the error detecting means the detected address information is erroneous, the recording-system clock used when recording the information onto the recordable optical disk is generated based on the address information generated by the address-information generating means and an output signal of the oscillator element.

4. The optical disk apparatus according to claim 1, wherein the recordable optical disk is one that is selected from among CD-R, CD-RW, DVD-R, DVD-RW, DVD+R, and DVD+RW.

5. The optical disk apparatus according to claim 1, wherein the address information includes information of minute, second, and a block or a logical block.

6. The optical disk apparatus according to claim 1, wherein the address information is either ATIP, LPP or ADIP.

7. An optical disk according to claim 1 further comprising:
   recording-strategy maintaining means for maintaining a plurality of recording strategies used when recording the information onto the recordable optical disk; and
   recording-strategy-updating timing outputting means for outputting a recording-strategy-updating timing signal that switches a recording strategy based on the address information.

8. An optical disk apparatus according to claim 1 further comprising:
   laser-power-setting maintaining means for maintaining a plurality of laser power preset values used when recording the information onto the recordable optical disk; and
   recording-power-updating timing outputting means for outputting a recording-power-updating timing signal that switches the laser power setting based on the address information.

9. An information recording apparatus comprising:
   address-information detecting means for reproducing and demodulating address information recorded onto an information recording medium;
   encoding means for generating recording data to be recorded onto the information recording medium;
   data recording means for recording the recording data onto the information recording medium;
   clock generating means for generating a recording-system clock that serves as a reference for operations of the encoding means and the data recording means;
   clock-frequency setting means for setting a frequency of the recording-system clock that is outputted from the clock generating means;
   recording-position detecting means for detecting a data recording position on the information recording medium;
   clock-frequency calculating means for calculating a target recording-system clock frequency based on the address information and the data-recording-position information and for outputting clock-frequency setting information to the clock-frequency setting means so that the recording-system clock frequency comes close to the target recording-system clock frequency;

clock-frequency-updating timing outputting means for outputting a clock-frequency-updating timing signal to indicate updating timing of a clock frequency to the clock-frequency setting means; and predicted-address-information calculating means for calculating predicted address information at a recording position from the address information after starting the recording and the recording-system clock, wherein, when the information is recorded onto the information recording medium, the clock-frequency calculating means updates the recording-system clock frequency based on the clock-frequency setting information every time the clock-frequency-updating timing signal is inputted, and the encoding means and the data recording means record the information onto the information recording medium based on the recording-system clock outputted from the clock generating means, wherein, when recording the information onto the information recording medium, the clock-frequency calculating means outputs the clock-frequency setting information based on the data-recording-position information and the predicted address information, and the clock-updating timing outputting means outputs the clock-frequency-updating timing signal every time the predicted address information varies by a predetermined value.

10. The information recording apparatus according to claim 9, wherein, when recording the information onto the information recording medium, the clock-frequency calculating means outputs the clock-frequency setting information based on the data-recording-position information and the address information, and the clock-updating timing outputting means outputs the clock-frequency-updating timing signal every time the address information detected by the address-information detecting means varies by a predetermined value.

11. The information recording apparatus according to claim 9, wherein, when the information is recorded onto the information recording medium, the clock-frequency calculating means outputs the clock-frequency setting information based on the data-recording-position information and the address information, and the clock-updating timing outputting means outputs the clock-frequency-updating timing signal at predetermined time intervals.

12. An information recording apparatus comprising:

address-information detecting means for reproducing and demodulating address information recorded onto an information recording medium;

encoding means for generating recording data to be recorded onto the information recording medium;

data recording means for recording the recording data onto the information recording medium;

clock generating means for generating a recording-system clock that serves as a reference for operations of the encoding means and the data recording means;

clock-frequency setting means for setting a frequency of the recording-system clock that is outputted from the clock generating means;

recording-position detecting means for detecting a data recording position on the information recording medium;

clock-frequency calculating means for calculating a target recording-system clock frequency based on the address information and the data-recording-position information and for outputting clock-frequency setting information to the clock-frequency setting means so that the recording-system clock frequency comes close to the target recording-system clock frequency;

clock-frequency-updating timing outputting means for outputting a clock-frequency-updating timing signal to indicate updating timing of a clock frequency to the clock-frequency setting means; and address-information error detecting means for detecting whether the address information detected by the address-information detecting means is correct or not and outputting address correct/error information, wherein, when the information is recorded onto the information recording medium, the clock-frequency calculating means updates the recording-system clock frequency based on the clock-frequency setting information every time the clock-frequency-updating timing signal is inputted, and the encoding means and the data recording means record the information onto the information recording medium based on the recording-system clock outputted from the clock generating means, wherein, when the information is recorded onto the information recording medium, the clock-frequency calculating means outputs the clock-frequency setting information based on the data-recording-position information and the address information, and the clock-updating timing outputting means outputs the clock-frequency-updating timing signal every time confirmed address information that was proved to be free from errors by means of the address correct/error information that is detected by the address-information detecting means and is outputted from the address-information error detecting means varies by a predetermined value.

13. An information recording apparatus comprising:

address-information detecting means for reproducing and demodulating address information recorded onto an information recording medium;

encoding means for generating recording data to be recorded onto the information recording medium;

data recording means for recording the recording data onto the information recording medium;

clock generating means for generating a recording-system clock that serves as a reference for operations of the encoding means and the data recording means;

clock-frequency setting means for setting a frequency of the recording-system clock that is outputted from the clock generating means;

recording-position detecting means for detecting a data recording position on the information recording medium;

clock-frequency calculating means for calculating a target recording-system clock frequency based on the address information and the data-recording-position information and for outputting clock-frequency setting information to the clock-frequency setting means so that the recording-system clock frequency comes close to the target recording-system clock frequency; and clock-frequency-updating timing outputting means for outputting a clock-frequency-updating timing signal to indicate updating timing of a clock frequency to the clock-frequency setting means;

predicted-address-information calculating means for calculating predicted address information at a recording position from the address information after starting the recording and the recording-system clock;

address-information error detecting means for detecting whether the address information detected by the address-information detecting means is correct or not and outputting address correct/error information; and address-information switching means that refers to the address correct/error information, when the address information correct/error information proves the address information to be correct, selects the address information from the address information, when the address information correct/error information proves the address information to be erroneous, selects the predicted address information therefrom, and outputs protected address information thus selected at its output, wherein, when the information is recorded onto the information recording medium, the clock-frequency calculating means outputs the clock-frequency setting information based on the data-recording-position information and the protected address information, and the clock-updating timing outputting means outputs the clock-frequency-updating timing signal every time the protected address information varies by an approximately predetermined value, wherein, when the information is recorded onto the information recording medium, the clock-frequency calculating means undates the recording-system clock frequency based on the clock-frequency setting information every time the clock-frequency-updating timing signal is inputted, and the encoding means and the data recording means record the information onto the information recording medium based on the recording-system clock outputted from the clock generating means.

14. The information recording apparatus according to claim 9, wherein the amount of energy that is inputted to the information recording medium when recording the information onto the information recording medium is varied in synchronization with updating of the recording-system clock frequency setting.

15. The information recording apparatus according to claim 9, wherein the energy pulse that is applied to the information recording medium when recording the information onto the information recording medium is intermittently varied in synchronization with updating of the recording-system clock frequency setting.

16. The information recording apparatus according to claim 9, wherein the clock generating means for generating a recording-system clock generates and outputs a clock signal of a frequency fo=fs ×(M/N) (where M and N denote natural numbers) based on a standard frequency signal source of a frequency fs by using a frequency synthesizer circuit.

17. The information recording apparatus according to claim 9, wherein assuming that the recording-system clock frequency before and after the updating of the recording-system clock frequency setting as fo1 and fo2, respectively, and that $\Delta f=(fo1-fo2)/fo1$, an absolute value of $\Delta f$ is 0.01 or less.

18. The information recording apparatus according to either claim 12 or claim 13, wherein the address-information error detecting means for detecting whether the address information detected by the address-information detecting means is correct or not uses a detection result of the cyclic redundancy code of the address information, and when the detection result of the cyclic redundancy code proves the address information to be correct, judges the address information to be correct.

19. The information recording apparatus according to either claim 12 or claim 13, wherein the address-information error detecting means for detecting whether the address information detected by the address-information detecting means is correct or not uses a detection result of address information continuity that represents whether or not the continuity of the address information is maintained, and when the detection result of the address information continuity proves that the continuity is maintained, judges the address information to be correct.

20. The information recording apparatus according to claim 9, wherein when erasing the information that has been recorded onto the information recording medium, the amount of energy that is inputted in the information recording medium is varied in synchronization with updating of the recording-system clock frequency setting.

21. The information recording apparatus according to claim 9, wherein when reproducing the address information that has been recorded onto the information recording medium, the amount of energy that is inputted in the information recording medium is varied in synchronization with updating of the recording-system clock frequency setting.

22. The information recording apparatus according to claim 9, wherein sample/hold timing at which the servo signal or the wobble signal is sampled and held during the recording is varied in synchronization with updating of the recording-system clock frequency setting.

23. The information recording apparatus according to claim 9, further comprising recording-operation halt detecting means for detecting halt of a recording operation and outputting a recording-operation halt signal, wherein, when the recording operation is halted, the recording-system clock frequency setting is not updated in conformity to said recording-operation halt signal.

24. The information recording apparatus according to claim 9, wherein the data-recording-position information to be outputted from the recording-position detecting means and the clock-frequency setting information to be outputted from the clock-frequency calculating means are outputted in response to an instruction of updating timing based on the clock-frequency-updating timing information.

* * * * *